United States Patent
Thomas et al.

(10) Patent No.: US 7,305,696 B2
(45) Date of Patent: Dec. 4, 2007

(54) THREE PART ARCHITECTURE FOR DIGITAL TELEVISION DATA BROADCASTING

(75) Inventors: C. Gomer Thomas, Piscataway, NJ (US); Nagaraj Nandhakumar, Cranbury, NJ (US); Dinkar Bhat, Monmouth Jct, NJ (US); James Kenealy, Plainsboro, NJ (US); Ilya Shnayder, Milltown, NJ (US); Patricia Lee Crabtree, Perrineville, NJ (US); Bradford Ward Holcombe, Hillsborough, NJ (US)

(73) Assignee: Triveni Digital, Inc., Princeton Junction, NJ (US)

( * ) Notice: Subject to any disclaimer, the term of this patent is extended or adjusted under 35 U.S.C. 154(b) by 1075 days.

(21) Appl. No.: 09/835,515

(22) Filed: Apr. 17, 2001

(65) Prior Publication Data

US 2002/0023270 A1  Feb. 21, 2002

Related U.S. Application Data

(60) Provisional application No. 60/197,665, filed on Apr. 17, 2000.

(51) Int. Cl.
*H04N 5/445* (2006.01)
*H04N 7/173* (2006.01)
*H04J 1/00* (2006.01)
*G06F 15/16* (2006.01)

(52) U.S. Cl. .................... 725/114; 725/37; 725/91; 725/95; 725/138; 370/485; 370/486; 370/487; 709/205; 709/235

(58) Field of Classification Search ............... 715/784, 715/785; 370/485–487; 725/37, 67, 73, 725/64, 82, 91, 109, 114, 138, 144, 32, 36, 725/58; 705/14; 709/205, 235
See application file for complete search history.

(56) References Cited

U.S. PATENT DOCUMENTS

| | | | | |
|---|---|---|---|---|
| 5,917,830 | A  * | 6/1999  | Chen et al. ................. | 370/487 |
| 5,929,850 | A  * | 7/1999  | Broadwin et al. .......... | 725/110 |
| 5,933,811 | A  * | 8/1999  | Angles et al. .............. | 705/14 |
| 5,966,120 | A  * | 10/1999 | Arazi et al. ................. | 715/724 |
| 6,018,764 | A  * | 1/2000  | Field et al. ................. | 709/217 |
| 6,253,189 | B1 * | 6/2001  | Feezell et al. ............... | 705/14 |
| 6,317,885 | B1 * | 11/2001 | Fries .......................... | 725/109 |
| 6,324,519 | B1 * | 11/2001 | Eldering ..................... | 705/14 |
| 6,459,427 | B1 * | 10/2002 | Mao et al. .................. | 725/109 |
| 6,460,040 | B1 * | 10/2002 | Burns ......................... | 707/10 |

(Continued)

*Primary Examiner*—Chris Kelley
*Assistant Examiner*—Son P Huynh
(74) *Attorney, Agent, or Firm*—Birch, Stewart, Kolasch & Birch, LLP

(57) ABSTRACT

This invention provides technology (including apparatus, method, software, and/or data structures) to broadcast data from one or more content providers via one or more broadcast channels to one or more content recipients. This technology meets the different needs of the three major stakeholders—the content providers, the broadcasters, and the content recipients. The technology provides support for identifying the data to be broadcast, setting the broadcast schedule, getting the data inserted into the broadcast stream, extracting it from the broadcast stream at the receiver, and many ancillary activities such as compression, error correction, bandwidth management, bandwidth usage reporting, and content filtering at the receiver.

34 Claims, 41 Drawing Sheets

U.S. PATENT DOCUMENTS

| | | | |
|---|---|---|---|
| 6,480,861 B1* | 11/2002 | Kanevsky et al. | 707/103 Y |
| 6,530,084 B1* | 3/2003 | Del Sesto et al. | 725/61 |
| 6,698,020 B1* | 2/2004 | Zigmond et al. | 725/34 |
| 6,820,277 B1* | 11/2004 | Eldering et al. | 725/35 |
| 6,886,178 B1* | 4/2005 | Mao et al. | 725/52 |
| 7,103,904 B1* | 9/2006 | Blackketter et al. | 725/32 |
| 2001/0014876 A1* | 8/2001 | Miyashita | 705/37 |
| 2002/0004743 A1* | 1/2002 | Kutaragi et al. | 705/14 |
| 2002/0007402 A1* | 1/2002 | Huston et al. | 709/217 |
| 2002/0007494 A1* | 1/2002 | Hodge | 725/109 |
| 2002/0010936 A1* | 1/2002 | Adam | 725/91 |
| 2004/0205817 A1* | 10/2004 | Soma et al. | 725/50 |
| 2004/0210944 A1* | 10/2004 | Brassil et al. | 705/135 |
| 2005/0149964 A1* | 7/2005 | Thomas et al. | 725/9 |
| 2005/0198677 A1* | 9/2005 | Lewis | 725/87 |
| 2005/0204388 A1* | 9/2005 | Knudson et al. | 725/58 |

* cited by examiner

File   Edit   View (−) Acct-101
  (−) C1
    (−) G1
      (+) G11
      (+) G12
    (−) G2
      P21
      P22
      P23
    P1
    P2
    (−) G3
      (−) G31
        P311
        P312
        P313
        P314
      P31
  (+) C2
(+) Acct-102
(+) Acct-103

ACCOUNT: Acct-101        GROUP: G2
CATALOG: C1              ITEM: P22

| Information | Subject | Transfer | Broadcast |

Transfer Mode:    DELIVER ▾

Source Loc:       C:\Music\Soul\AF Album 5      [Browse]

Start date/time:  Mar 17 2001 00:00:00

End date/time:    Apr 16 2001 24:00:00

○ Interval                                    ▾ MINUTES

⦿ Times           2:00 am                     ▾ DAILY

[Save]  [Cancel]                              [Synch Catalog]

Figure 19

DATAHUB

File  Edit  View (−)CP-1
   Acct-101
   Acct-102
   Acct-103
(+)CP-2
(−)CP-3
   Acct-301
   Acct-302
   Acct-303
(+)CP-4
(+)CP-5

ACCOUNT Acct-301

| Information | Tech Contact | Bus Contact | Bandwidth |
|---|---|---|---|

Short Name: Acct-301

Full Name: Account Number 301

ID Number: 08348503446827172984

CP ID #: 06734829133325857488

Output I/F: DVB-ASI    PID 0x130F

IP Dest. Addr 128.94.56.137    Port 6050

[ Save ]    [ Cancel ]

Figure 22

| Parameters Specified | | | | Behavior |
|---|---|---|---|---|
| Interval | Bitrate | Duration | Count | |
| Y | Y | Y | Y | If Interval < Size/Bitrate, set Interval = Size/Bitrate. Ignore Count. Broadcast at Interval using Bitrate, for Duration (timed). |
| Y | Y | Y | N | If Interval < Size/Bitrate, set Interval = Size/Bitrate. Broadcast at Interval using Bitrate, for Duration (timed). |
| Y | Y | N | Y | If Interval < Size/Bitrate, set Interval = Size/Bitrate. Broadcast at Interval using Bitrate, Count times (timed). |
| Y | Y | N | N | If Interval < Size/Bitrate, set Interval = Size/Bitrate. Broadcast at Interval using Bitrate, indefinitely (timed). |
| Y | N | Y | Y | Set Bitrate = account bitrate. If Interval < Size/Bitrate, set Interval = Size/Bitrate. Ignore Count. Broadcast at Interval using Bitrate, for Duration (timed). |
| Y | N | Y | N | Set Bitrate = account bitrate. If Interval < Size/Bitrate, set Interval = Size/Bitrate. Broadcast at Interval using Bitrate, for Duration (timed). |
| Y | N | N | Y | Set Bitrate = account bitrate. If Interval < Size/Bitrate, set Interval = Size/Bitrate. Broadcast at Interval using Bitrate, Count times (timed). |
| Y | N | N | N | Set Bitrate = account bitrate. If Interval < Size/Bitrate, set Interval = Size/Bitrate. Broadcast at Interval using Bitrate, indefinitely (timed). |

Fig. 28A

| Parameters Specified | | | | Behavior |
|---|---|---|---|---|
| Interval | Bitrate | Duration | Count | |
| N | Y | Y | Y | Set Interval = Duration/Count.<br>If Interval < Size/Bitrate, set Interval = Size/Bitrate.<br>Broadcast at Interval using Bitrate, for Duration (timed). |
| N | Y | Y | N | Set Interval = Size/Bitrate.<br>Broadcast at Interval using Bitrate, for Duration (timed). |
| N | Y | N | Y | Set Interval = Size/Bitrate.<br>Broadcast at Interval using Bitrate, Count times (timed). |
| N | Y | N | N | Set Interval = Size/Bitrate.<br>Broadcast at Interval using Bitrate, indefinitely (timed). |
| N | N | Y | Y | Set Bitrate = account bitrate. Set Interval = Duration/Count.<br>If Interval < Size/Bitrate, set Interval = Size/Bitrate.<br>Broadcast at Interval using Bitrate, for Duration. |
| N | N | Y | N | Broadcast for Duration (non-timed). |
| N | N | N | Y | Broadcast Count times (non-timed). |
| N | N | N | N | Broadcast indefinitely (non-timed). |

Fig. 28B

Example: Account bitrate limit: 500 kbits/sec (62,500 bytes/sec)
Time slice: 200 millisecond (0.2 second)
Can broadcast up to 12,500 bytes during timeslice

| Items in combined queues (in order of overall priority) | Disposition of items |
|---|---|
| Item A<br>Size: 15,000 bytes<br>Bitrate limit: 200 kbits/sec (25,000 bytes/sec, 5,000 bytes/slice) | 5,000 bytes taken;<br>rest of item remains on queue in same position |
| Item B<br>Size: 4,000 bytes<br>Bitrate limit: none specified | All 4,000 bytes taken;<br>item is taken off of queue |
| Item C<br>Size: 4,000 bytes<br>Bitrate limit: 100 kbits/sec (12,500 bytes/sec, 2,500 bytes/slice) | 2,500 bytes taken;<br>rest of item remains on queue in same position |
| Item D<br>Size: 20,000 bytes<br>Bitrate limit: none specified | 500 bytes taken;<br>rest of item remains on queue in same position |

Figure 33

THREE PART ARCHITECTURE FOR DIGITAL TELEVISION DATA BROADCASTING

CONTINUING APPLICATION INFORMATION

This application claims priority under 35 U.S.C. § 119 upon U.S. Provisional Patent Application, Ser. No. 60/197,665, filed Apr. 17, 2000, the entire contents of which are hereby incorporated by reference.

FIELD OF THE INVENTION

The invention is generally directed to the field of digital television (DTV) broadcasting, and more particularly to broadcasting data via a digital television signal, and more particularly to a three part architecture for such DTV data broadcasting.

BACKGROUND OF THE INVENTION

The invention described in this disclosure was developed for broadcasting data via ATSC terrestrial digital television signals, but it applies equally well to broadcasting data via digital television in general, and in fact many aspects of it apply to broadcasting data via any point-to-multipoint digital broadcast medium.

There are three primary roles involved in broadcasting content which is not closely synchronized in time to accompanying, pre-recorded audio and/or video content:

Content Provider—an individual or enterprise providing content to be broadcast A content provider may be the original creator of the content, or may be simply an aggregator of content, or may be a combination of the two.

Content Recipient—an individual or enterprise receiving broadcast content A content recipient may be the end user of the content, or may be simply passing it on to the end user(s) via some communications medium, or may be a combination of the two.

Broadcaster—an individual or enterprise that provides the broadcast medium for getting the content from the content provider to the content recipient.

A fourth role which may be very important in some situations is the Service Provider, an enterprise that contracts to manage the data broadcast activities of one or more of the other stakeholders.

There are many different possible payment models within this basic structure. Examples of some of the many possibilities include:

The content recipients may pay the content providers for the content, on either a subscription or pay-as-used basis, and the content providers may then pay the broadcaster for the use of the bandwidth.

The content may be licensed or sold to the broadcaster, and the broadcaster may get paid by the content recipients, on either a subscription or pay-as-used basis. (In this case the broadcaster may essentially be playing the role of both content provider and broadcaster, as far as data broadcasting is concerned.)

The content providers and/or the broadcaster may deliver the content to the content recipients free of charge, and get paid by advertisers for advertising embedded within the content in some way.

Some content providers and content recipients may be part of the same enterprise, so the providers simply pay the broadcaster for the use of the bandwidth to deliver the content to the recipients.

Some data broadcasting applications may require that only those recipients who are entitled to receive the data can have access to it, and it must be kept confidential from all other parties. In some cases it must be kept confidential even from the broadcaster. In other cases keeping the content confidential from the broadcaster may not be permitted. Thus, encryption may be required, and it may need to be performed before or after the data reaches the broadcast station. Some data broadcasting applications may require compression to optimize the use of the bandwidth. If both compression and encryption are to be applied, typically compression must be applied first, since compression techniques seldom succeed in reducing the size of data that has already been encrypted. Some data broadcasting applications may require forward error correction. Data broadcasting applications may require many different scheduling schemes and delivery mechanisms for getting the content to a location where it can be inserted into the broadcast, and for actually inserting the content into the broadcast stream. Some situations may require that the content recipients be able to filter the data, and extract only a portion of the content to which they are entitled. Content may take the form of discrete blocks of data (e.g., files), or may take the form of continuous streams.

SUMMARY OF THE INVENTION

This invention provides technology (including apparatus, method, software, and/or data structures) to broadcast data from one or more content providers via one or more broadcast channels to one or more content recipients. This technology meets the different needs of the three major stakeholders—the content providers, the broadcasters, and the content recipients. The technology provides support for identifying the data to be broadcast, setting the broadcast schedule, getting the data inserted into the broadcast stream, extracting it from the broadcast stream at the receiver, and many ancillary activities such as compression, error correction, bandwidth management, bandwidth usage reporting, and content filtering at the receiver.

Advantageous features of this invention include:

1) An architecture including three types of components that work together to provide the overall functionality of the system, together with the core capabilities of each:
   a) A Content Provider unit serving the needs of the Content Providers. This type of component is used to specify what data are to be broadcast, the appropriate parameters for their broadcast, including scheduling, encapsulation protocol, encryption, compression and error correction, and other information that may be needed by the Content Recipient components to handle the data properly after receipt, to request bandwidth allocations, and to deliver content to the Liaison unit(s).
   b) A Liaison unit serving the needs of the Broadcasters. This type of component is used to allocate bandwidth to different Content Providers, to retrieve, process and insert content into the broadcast stream according to the specifications from the Content Provider units, and to report on bandwidth usage.
   c) A Receiver unit serving the needs of the Content Recipients. This type of component is used to extract data from the broadcast stream and make the data available to end users, possibly filtering the data according to explicit or inferred user preferences.

2) A method for an instance of the Content Provider unit to broadcast data via any number of distinct instances of the Liaison unit, as well as the ability for any instance of the Liaison unit to broadcast data for any number of distinct instances of the Content Provider units.
3) A method for multiple customized Content Provider units, tailored for different applications, to interface with the Liaison units through a common interface specification.
4) A method for a single instance of the Content Provider unit to manage specifications and data for any number of distinct accounts representing distinct Content Providers.
5) A method for a single instance of the Liaison unit to insert content into any number of broadcast streams going out over different broadcast transmission systems.
6) A method for the Content Provider units to negotiate for bandwidth allocations from the Liaison units.
7) A very flexible method of organizing the data items to be broadcast into a hierarchy, with the ability for the Content Provider to specify attributes of the items at any level of the hierarchy, including scheduling attributes, with the values of the attributes inherited down the hierarchy unless overridden by a specification at a lower level of the hierarchy.
8) A method for using the Content Provider specifications and schedules to provide both the information needed by the Liaison unit to broadcast the data correctly and the information needed by the Content Recipient component to identify and extract the data correctly and efficiently, including support for applications that want to filter the received data on the basis of specific recipient selections, or recipient category preferences (explicitly provided, or inferred from past recipient behavior).
9) A very versatile method for specifying the broadcast schedule for data items, allowing the user to specify multiple "slots" for each data item, and to specify for each slot the broadcast start time and any combination of (a) count (number of times the items are to be broadcast), (b) bitrate (bits/second) at which the items are to be broadcast, (c) duration (overall time period during which the items are to be broadcast), (d) time interval between successive broadcasts (when the count is greater than 1), and (e) a repetition period for the entire slot (hours, days, weeks).
10) A very flexible queue management method to broadcast data items according to the schedules specified by the framework of (8), using a time slicing technique to ensure that bandwidth allocations and specifications are not exceeded.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

FIG. 9 gives action diagrams for two modes of bandwidth negotiation between a Content Provider unit 102 and a Liaison unit 104 that are supported by this invention. In the first mode, shown at the left in FIG. 9, a bandwidth allocation profile is created at the Liaison unit 104, and this profile is sent to the Content Provider unit 102 the next time bandwidth allocation information is requested. In the second mode, shown at the right in FIG. 9, a bandwidth allocation profile is created at the Content Provider unit 102 and is sent to the Liaison unit 104 as a request. At some later time a decision is made at the Liaison unit 104 whether to grant the request, and an undated bandwidth allocation profile is sent to the Content Provider unit 102 the next time bandwidth allocation information is requested after that.

FIG. 19 shows a possible user interface screen at a Content Provider unit 102 for viewing and editing information about a Group, which is an intermediate node in a hierarchy of content specification and scheduling information.

FIG. 22 shows a possible user interface screen at a Content Provider unit 102 for viewing and editing the schedule and related information for transferring a Content Item to a Liaison unit 104 for subsequent broadcast.

FIG. 28A and FIG. 28B describe in detail how the scheduling parameters are interpreted.

FIG. 33 illustrates the effect of the time-slicing mechanism used to guarantee that the flow of content to a Mixing unit does not exceed any of the bandwidth limitations on accounts or individual content items.

It is noted that reference numbers for like items in the figures have not been repeated throughout the drawings for simplicity.

DETAILED DESCRIPTION OF EXAMPLE EMBODIMENTS

1. Overall Architecture

The system has three primary components, or subsystems, each of which provides tools and facilities to support one of the three primary roles:

Content Provider unit 102

Liaison unit 104

Content Receiver unit 3402

A complete system for a collection of specific application scenarios may contain multiple instances of each component. Each Content Provider unit 102 may broadcast data through any number of Liaison units 104 to any number of Content Receiver units 3402. Each Liaison unit 104 may broadcast data for any number of Content Provider units 102 to any number of Content Receiver units 3402. Any Content Receiver unit 3402 may receive data from any number of Content Provider units 102 broadcast by any number of Liaison units 104.

Figure 39:
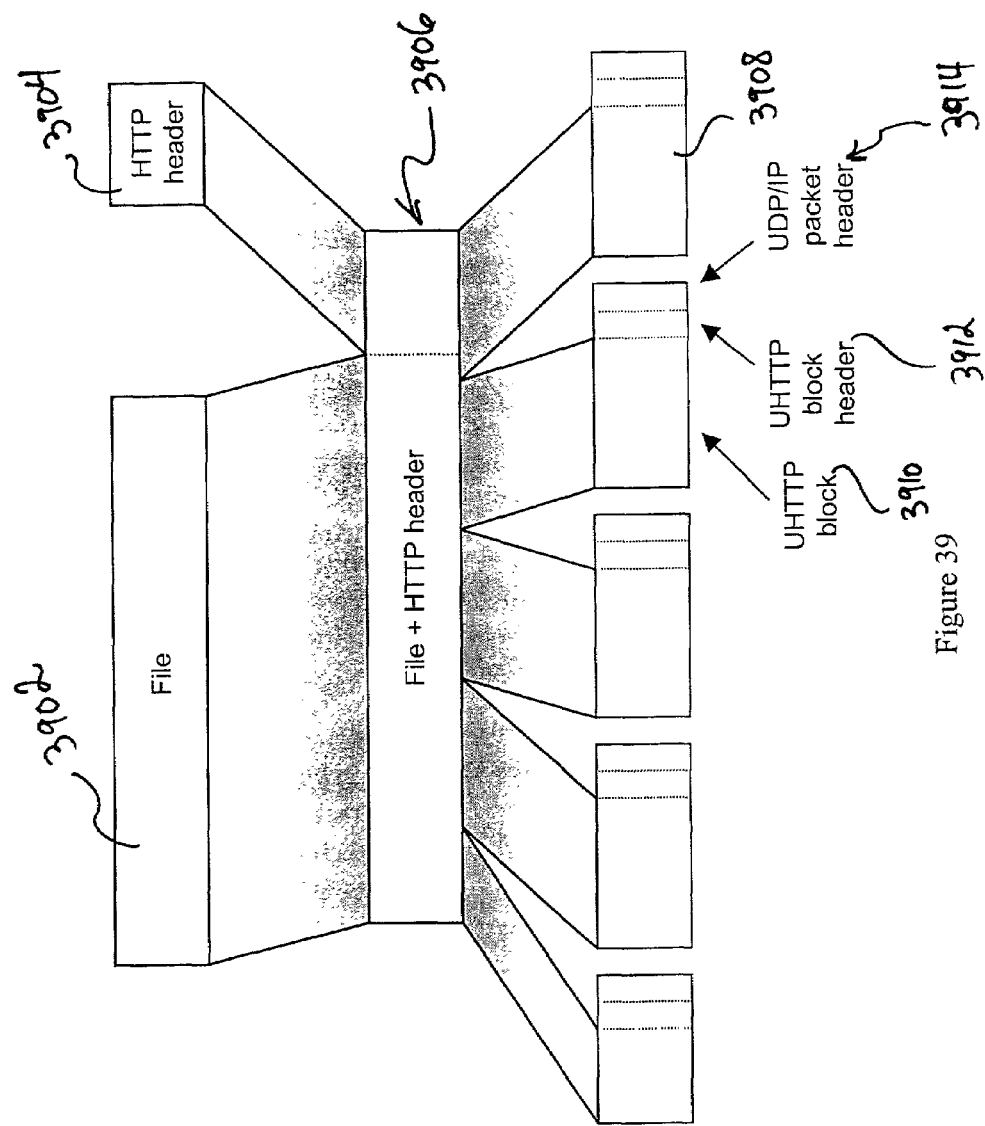
FIG. 39 shows how a file can be encapsulated in UDP/IP transport packets using the known UHTTP protocol. An HTTP header 3904 is put at the front of the file 3902, and the resulting extended file 3906 is packed into UDP/IP packets 3908. Each packet contains a UDP/IP packet header 3914, a UHTTP block header 3912, and a UHTTP block 3910 containing a portion of the extended file.
Figure 40:
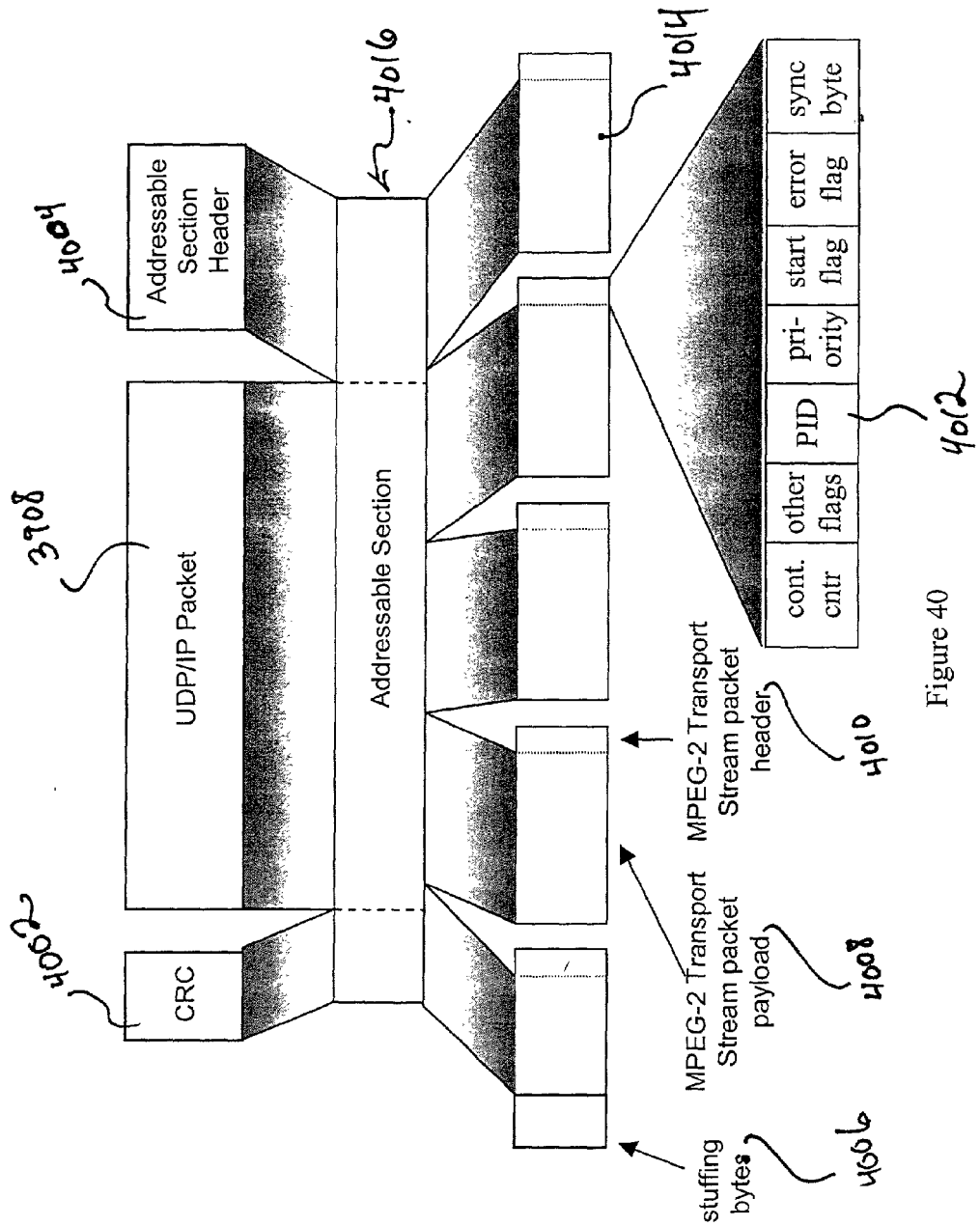
FIG. 40 shows how an UDP/IP packet can be packed into MPEG-2 Transport Stream packets using the known DSM-CC addressable section protocol. Each addressable section 4016 contains an addressable section header 4004, an UDP/IP packet 3908, and a CRC 4002 (Cyclic Redundancy Checksum). The addressable section is then packed into MPEG-2 Transport Stream packets according to the MPEG-2 Systems standard (ISO/IEC 13818-1). Each Transport Stream packet contains a transport packet header 4010, and a portion of the addressable section in the transport stream packet payload 4008. The last packet in the sequence containing an addressable section may be only partially full, and the remaining space is filled with stuffing bytes 4006.

In the description of this example embodiment it is assumed that all content can be broadcast in the form of UDP/IP (User Datagram Protocol/Internet Protocol) packets, with files divided into blocks and encapsulated in such packets, as illustrated in FIG. 39, and that the underlying transport is an MPEG-2 transport stream, with UDP/IP packets divided into blocks and encapsulated in MPEG-2 transport stream packets, as illustrated in FIG. 40. However, other formats and protocols could also be used.

The user interface for each of the components can be a graphical user interface (GUI) such as that supported by the Windows98 operating system and by standard graphics packages for Java programming environments.

Many features of each of the three primary components of the system allow a user to maintain a list of items of some sort, with facilities for editing items in the list, deleting items from the list, and adding items to the list. The user interface for these operations can be similar in each case: The user can click on a convenient button or menu item to cause the system to display the items in a list box. The user can click on an item in the list to cause a panel to appear showing the attributes of the item. The user can edit the item by editing the attributes in the panel. The user can then click on a "save" button on the panel to save the edits, or the user can click on a "cancel" button to discard them and return to the original values. The user can click on a "delete" button in some convenient location on the screen to delete a selected item. The user can click on an "add" button or "new" button in some convenient location on the screen to add a new item. This can cause a panel to appear on the screen with pre-set values for any attributes that are to be automatically generated (for example, a unique identification number) and fields for the user to enter values for the other attributes. After entering the values, the user can click on a "save" button on the panel to add the new item to the list, or the user can click on a "cancel" button on the panel to discard the new item and leave the list unchanged. This well known approach to this sort of user interface will often be referred to in this disclosure as the "usual" interface.

2. Content Provider Unit Design

A Content Provider unit 102 can be implemented as software running on a Personal Computer (PC) running under the Windows98® or Windows NT version 4.0 operating system. The software can be written in the Java® programming language. The PC can have an Ethernet® adapter allowing the Content Provider unit 102 to communicate with Liaison units 104 via the CORBA® IIOP protocol, with each Liaison unit 104 acting as a CORBA server, and each Content Provider unit 102 acting as a CORBA client. Such computer hardware and software is widely available from many vendors.

Figure 1:
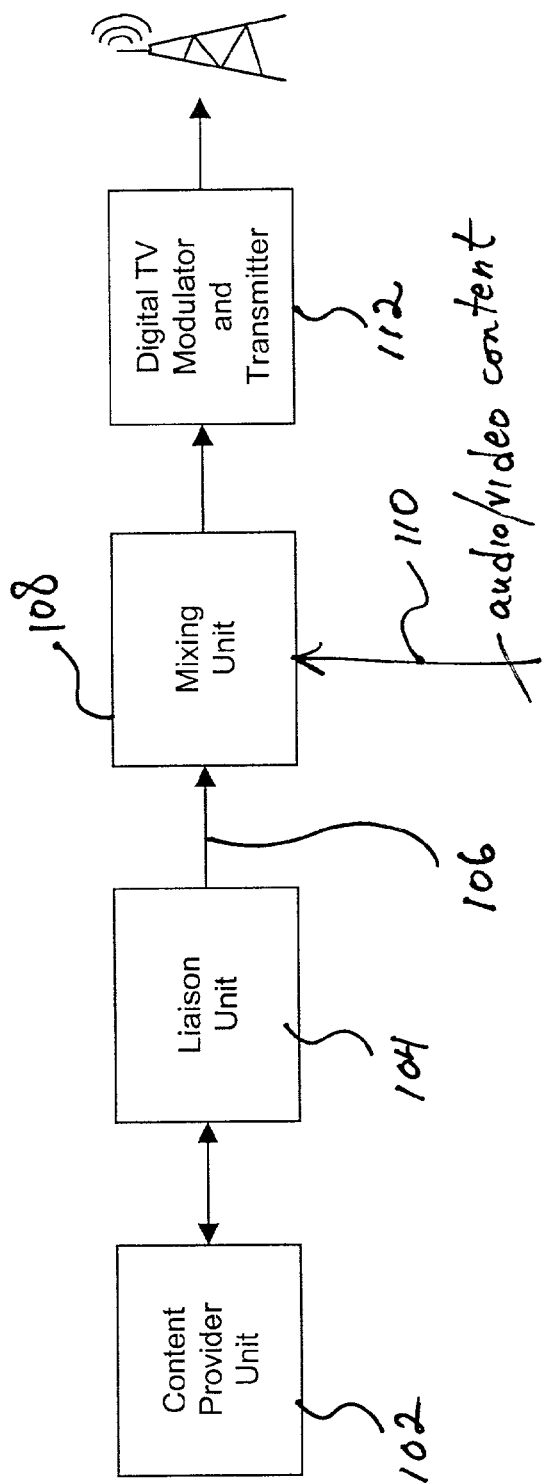
FIG. 1 illustrates a Content Provider unit 102 communicating with a Liaison unit 104 to negotiate bandwidth allocations, send content specifications and schedules, and deliver content. The Liaison unit 104 in turn is sending content 106 to a Mixing unit 108, where it is combined with audio-video content 110 and sent to a Digital TV Modulator and Transmitter unit 112 to be broadcast.
Figure 2:
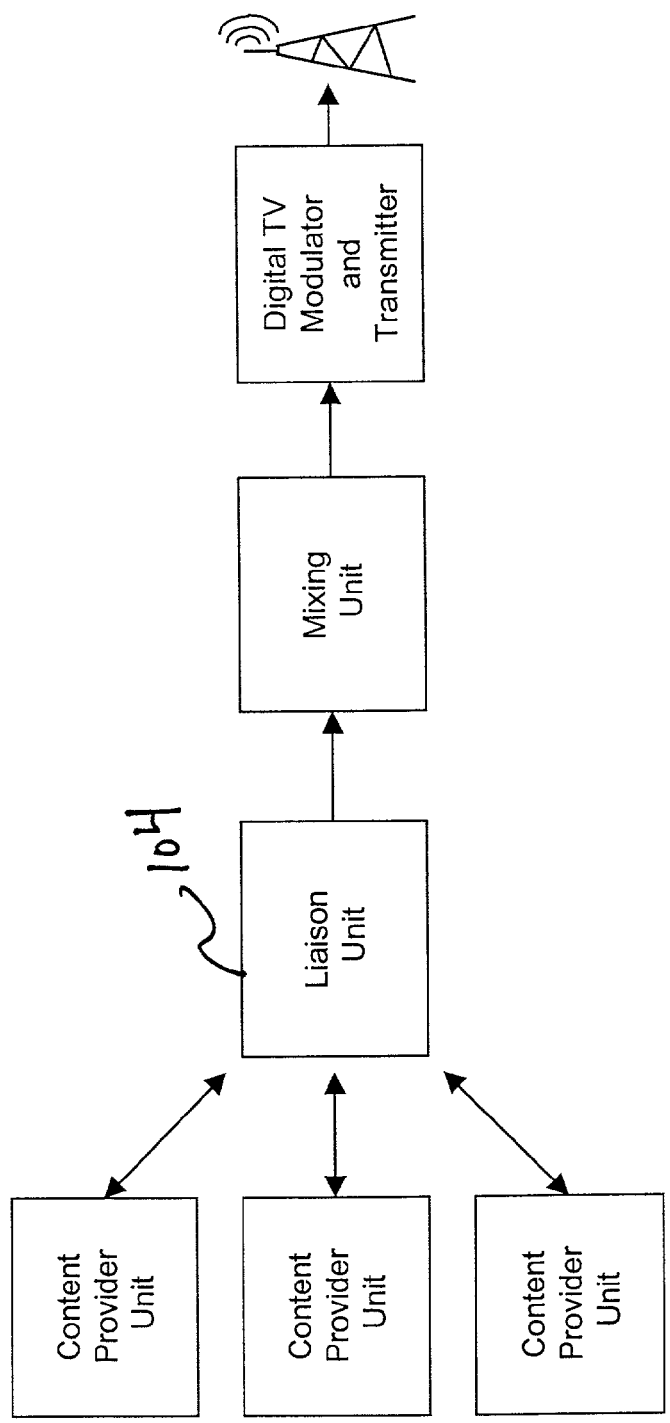
FIG. 2 illustrates a configuration in which multiple Content Provider units are communicating with the same Liaison unit 104.
Figure 3:
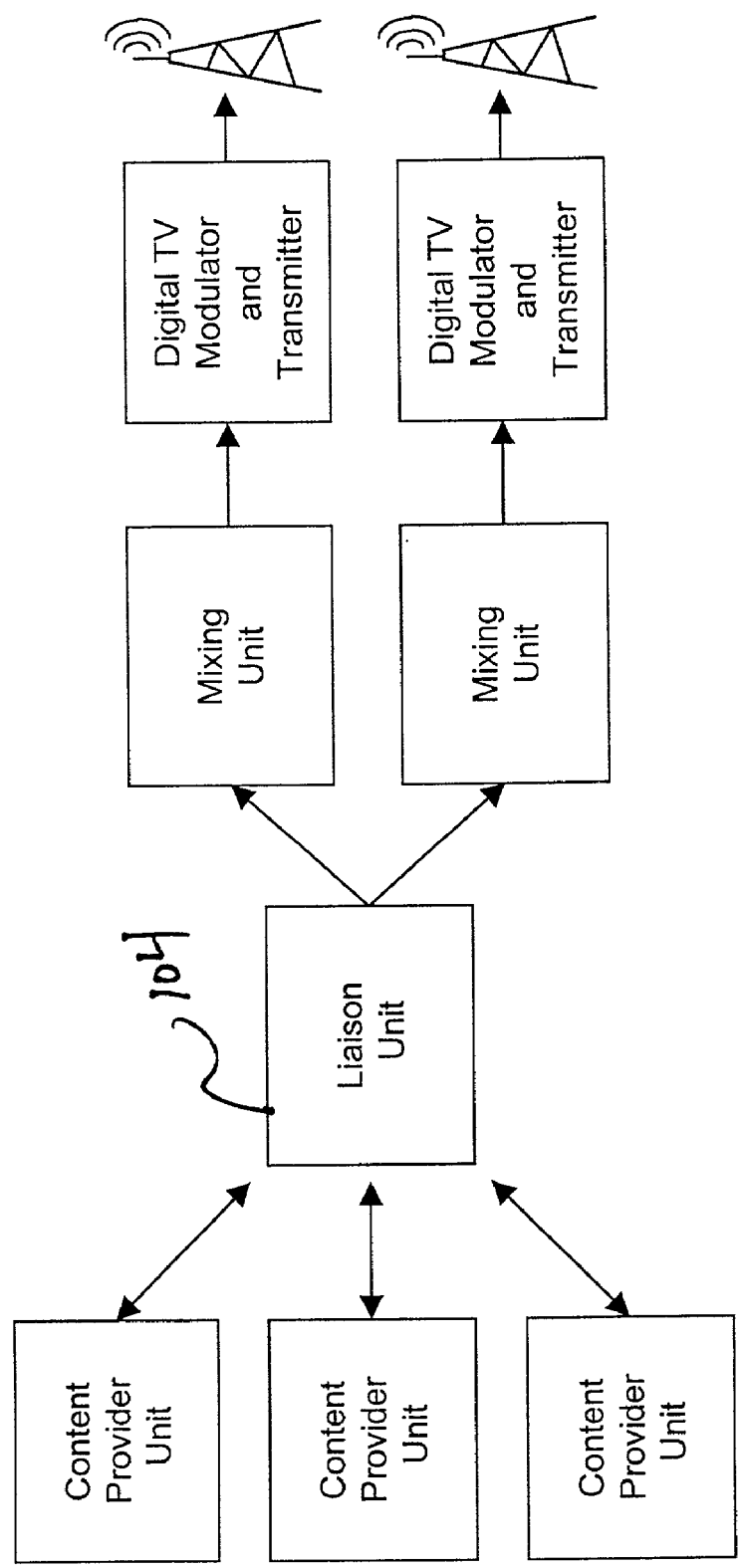
FIG. 3 illustrates a configuration in which a Liaison unit 104 is sending content to multiple Mixing units to be broadcast through multiple Modulators and Transmitters.
Figure 4:
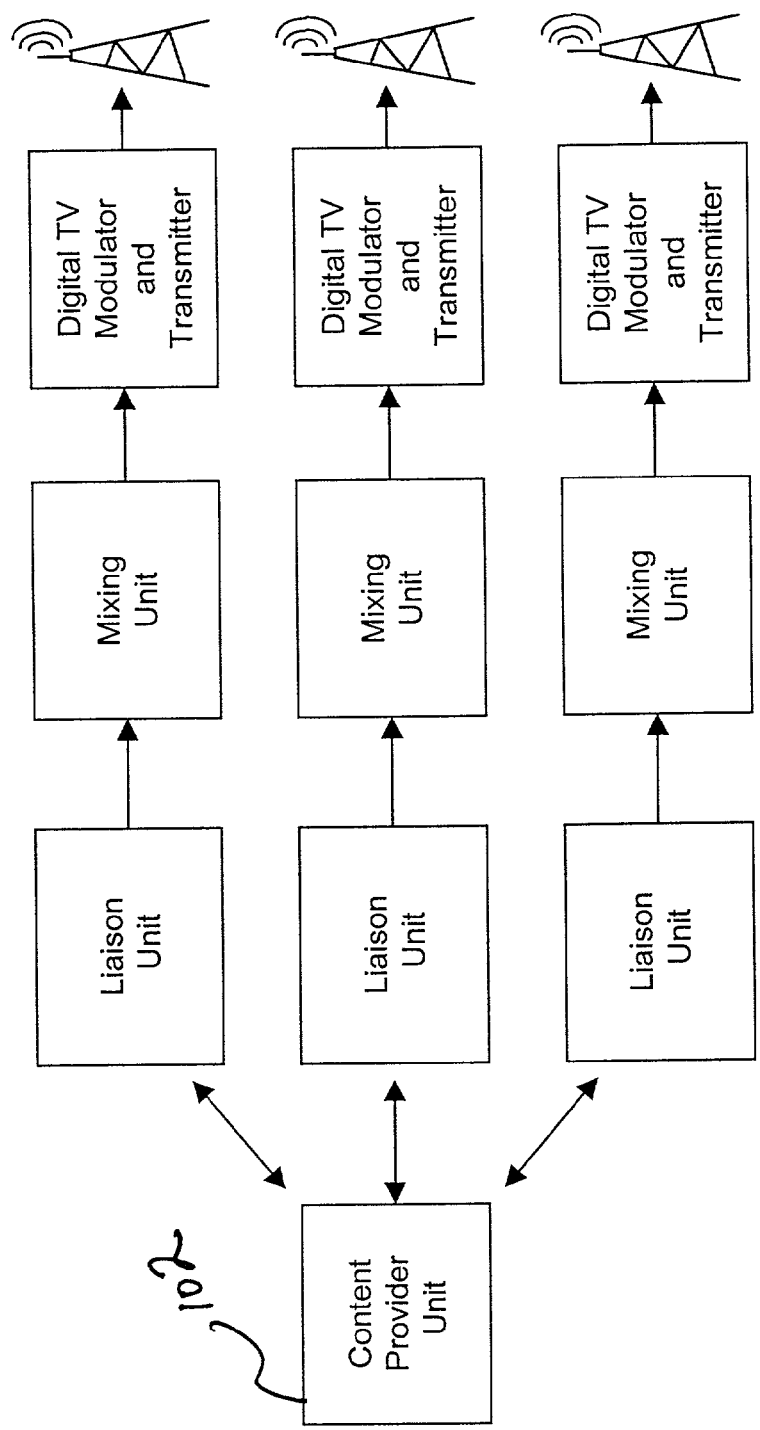
FIG. 4 illustrates a configuration in which a Content Provider unit 102 is communicating with multiple Liaison units 104, each of which is sending content for the Content Provider unit 102 to a Mixing unit for broadcast.
Figure 5:
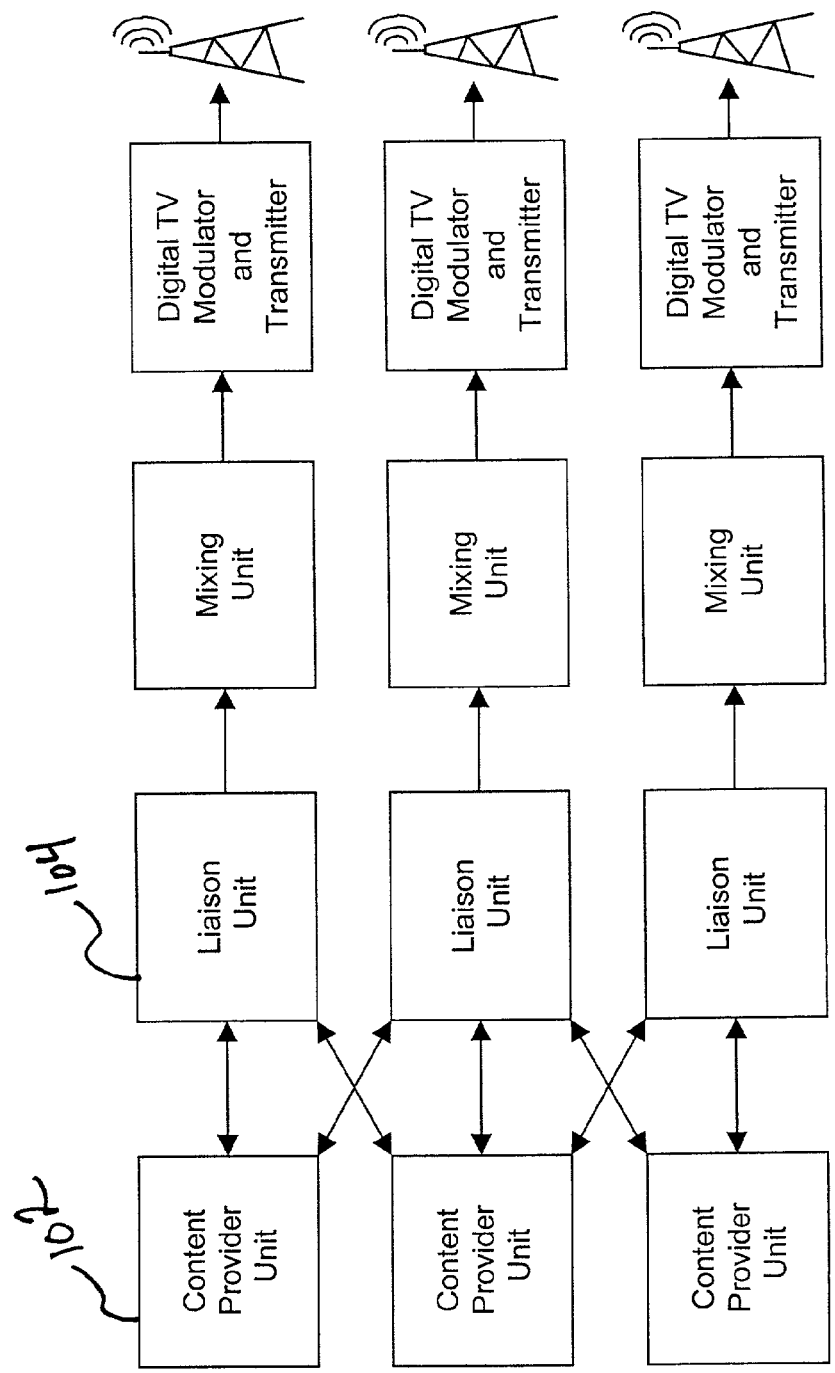
FIG. 5 illustrates a configuration where multiple Content Provider units are communicating with multiple Liaison units.
Figure 6:
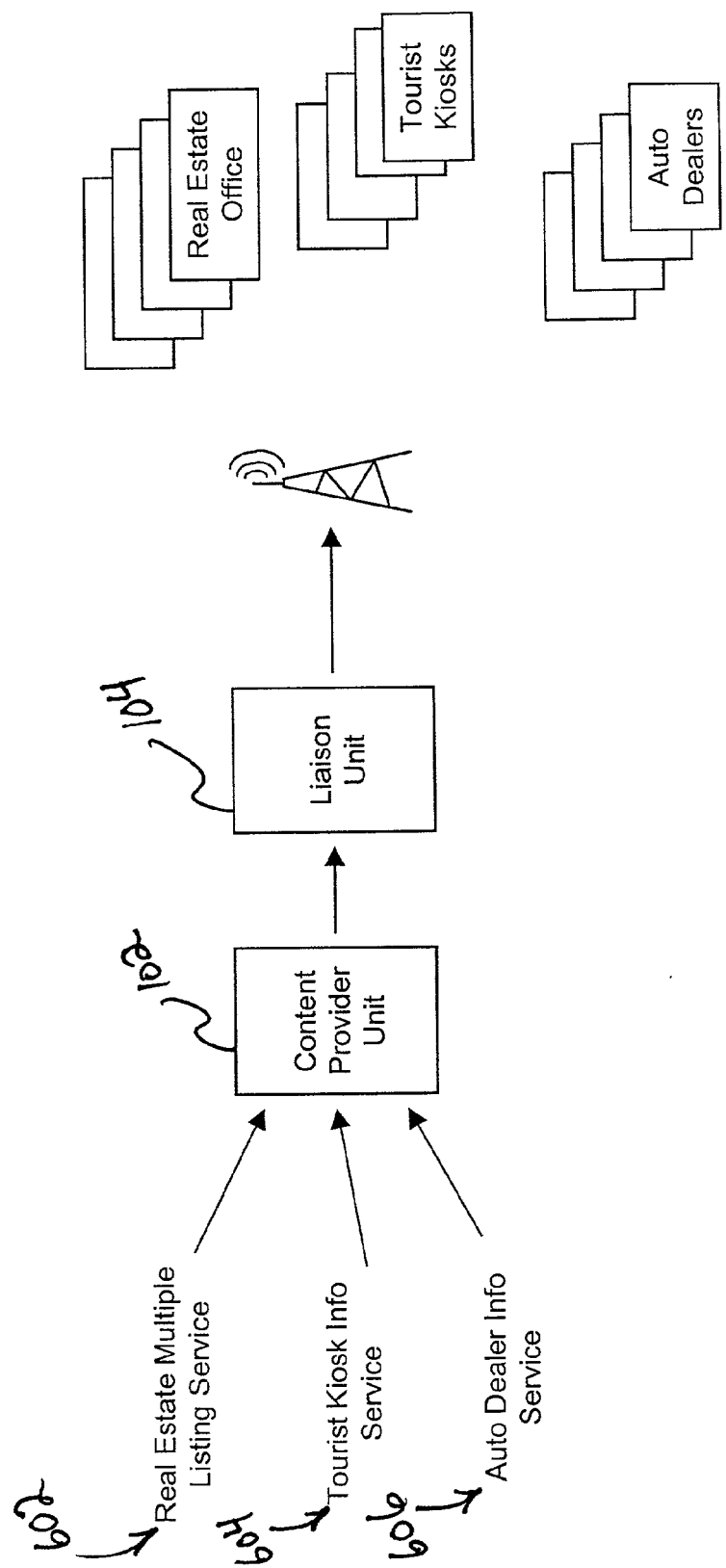
FIG. 6 illustrates a Content Provider unit 102 managing data for multiple different enterprises 602, 604, 606, where the Liaison unit 104 may need to allocate bandwidth separately to each enterprise and maintain bandwidth usage reports separately for each enterprise.
Figure 7:
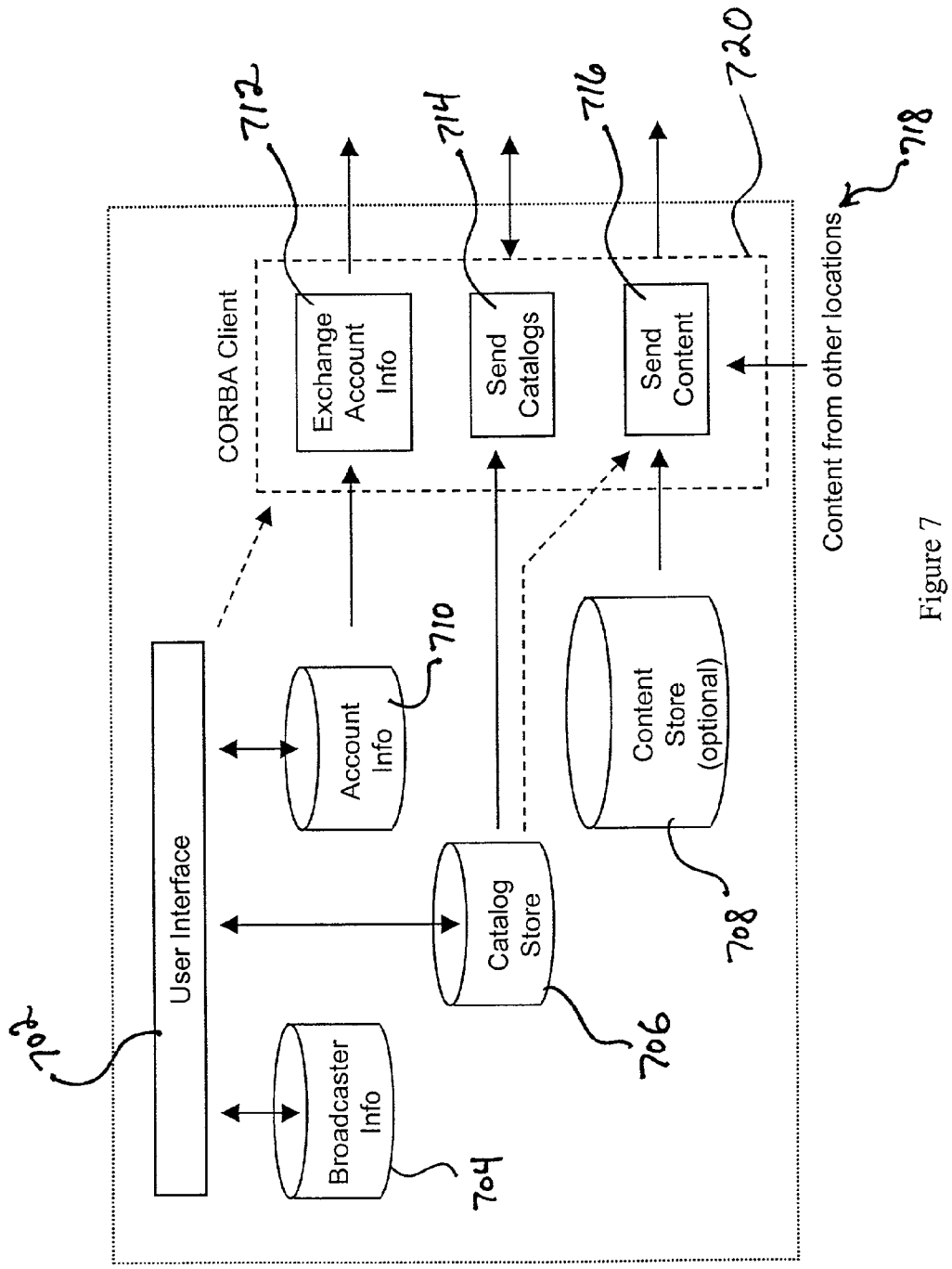
FIG. 7 shows a possible software architecture for a Content Provider unit 102.
Figure 8:
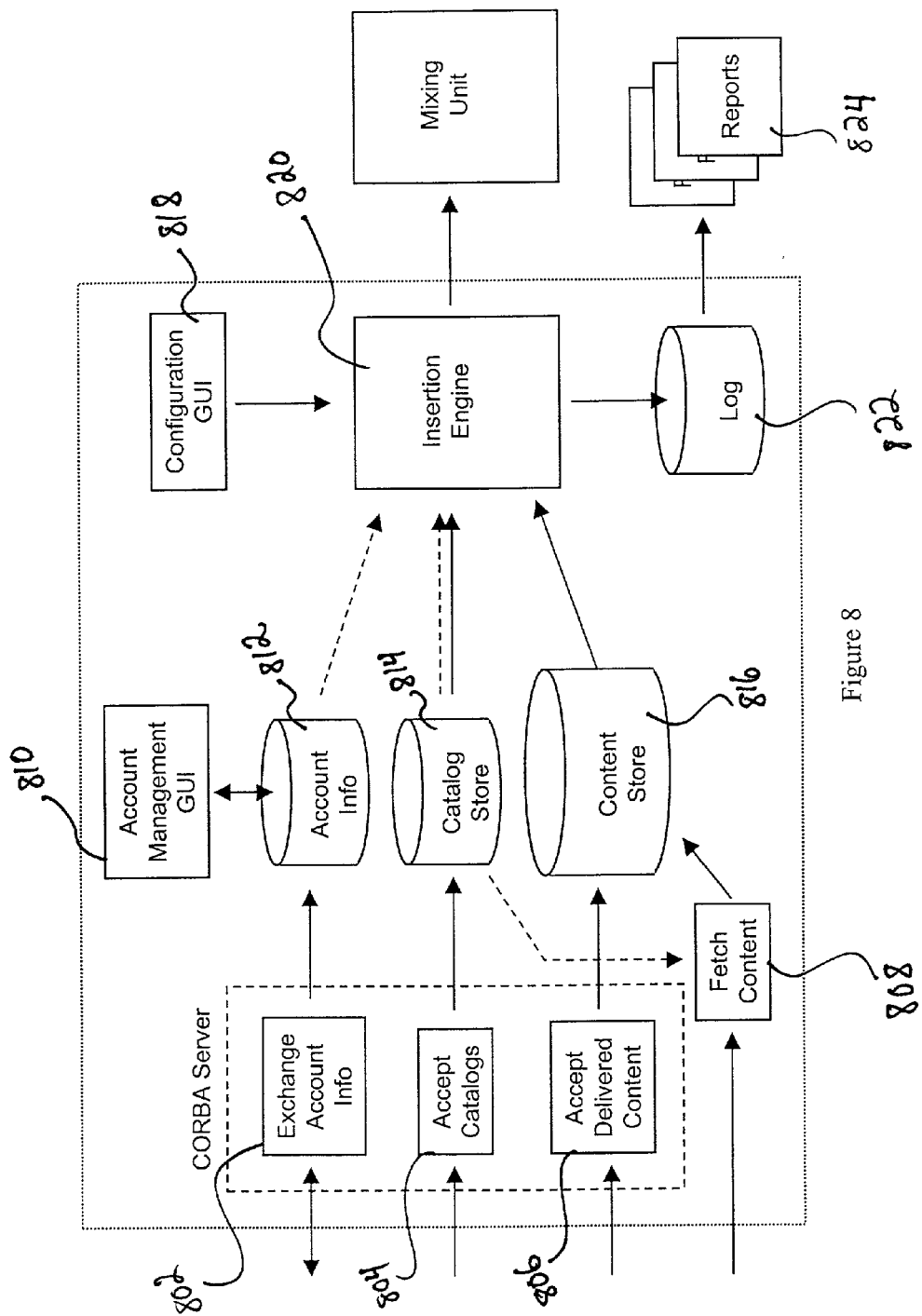
FIG. 8 shows a possible software architecture for a Liaison unit 104.

A software architecture for a Content Provider unit 102 is shown in FIG. 7. The user interface 702 can be used to maintain information about Liaison units in a Liaison Store 704, and to maintain information about accounts and the bandwidth allocated to them in an Account Info 710, and to maintain specifications of content, including scheduling information, in a Catalog Store 706. Some content may be stored at the Content Provider unit in a Content Store 708. An interface 720 to Liaison units can be in the form of a CORBA client. This interface 720 can include an Exchange Account Info component 712 that communicates with Liaison units about accounts and their bandwidth allocation profiles, a Send Catalogs component 714 that sends content specifications and schedules to Liaison units, and a Send Content component 716 that delivers content to Liaison units. The Send Content component 716 may get the content from the local Content Store 708, or it may collect it from other locations 718 via FTP or some other suitable protocol.

The CORBA object reference for each Liaison unit 104 that broadcasts data for a Content Provider unit 102 can be conveyed to the Content Provider unit 102 via some separate communications path, for example as an attachment to an email messages or as a file on a diskette physically delivered to a user, and stored on the local disk of the Content Provider unit 102 PC. Similarly, the Content Provider unit 102 can use a random number generator to generate a 64-bit ID number for itself, which will be globally unique with a very high degree of probability. This ID number can be conveyed to the Liaison unit 104 via some separate communications path, and it can be presented by the Content Provider unit 102 as a parameter whenever it invokes a CORBA operation at the Liaison unit 104. The Liaison unit 104 can use this to validate the request. The out-of-band exchange of these pieces of information allows the two systems to establish reasonably secure communications. Other well known methods, such as communication over the Secure Socket Layer (SSL) level 3 protocol, could be used to achieve the same result.

Figure 12:
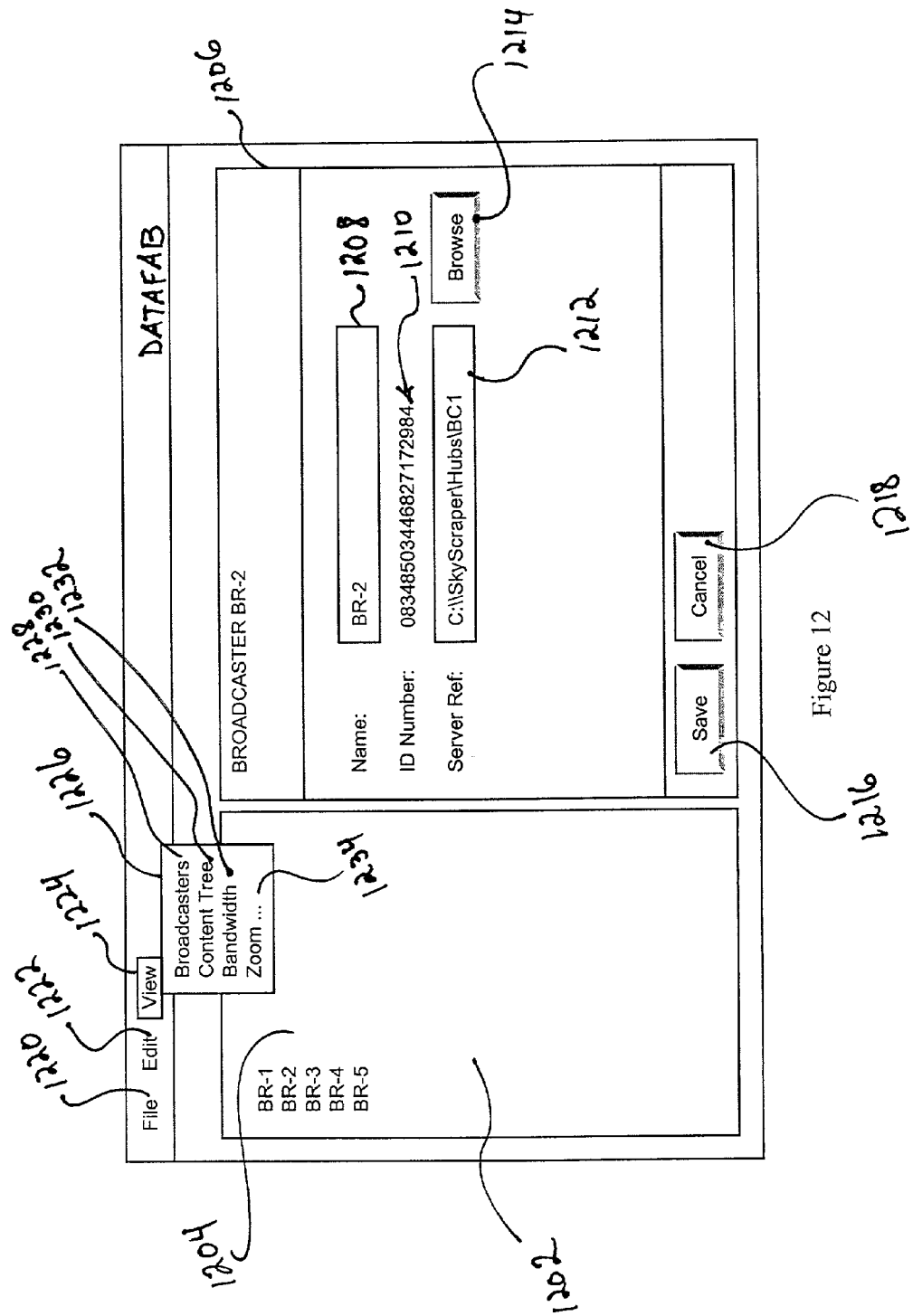
FIG. 12 shows a possible user interface screen at a Liaison unit 104 for maintaining information about Content Provider units 102 for which the Liaison unit 104 is broadcasting content.
Figure 15:
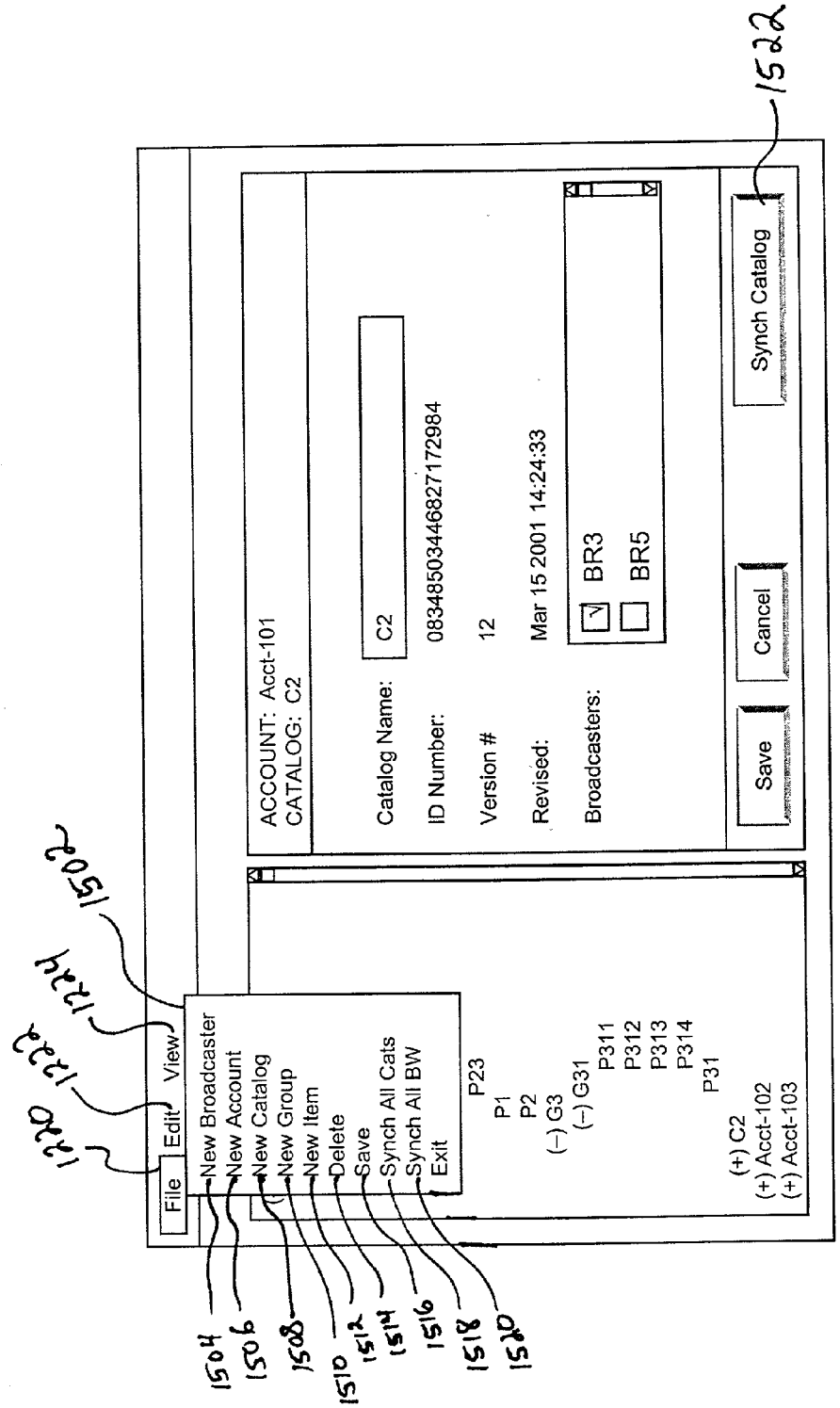
FIG. 15 shows a possible user interface screen at a Content Provider unit 102 for maintaining a list of the Liaison units which broadcast content for the Content Provider unit 102.

The GUI for the Content Provider unit can be a Windows application with File, Edit and View menu buttons at the top of the screen in the usual way. An example of the File menu 1502 that could appear from clicking on the File button 1220 is shown in FIG. 15. Typically only some choices would be available at any given time; others may be grayed out. An example of the View menu 1226 that could appear from clicking on the View button 1224 is shown in FIG. 12. It could be used to switch to a functional area of interest, for example to maintaining information about Liaison units (Broadcaster selection 1228), or to maintaining information about content specifications and schedules (Content Tree selection 1230), or to maintaining information about bandwidth allocations to accounts from Liaison units (Bandwidth selection 1232). It could also be used to change the zoom factor for display of bandwidth allocation graphs (Zoom selection 1234).

Features that can be in the Content Provider unit 102 are described in the remaining subsections of this section.

2.1 Maintaining Information About Liaison Units

The following information can be maintained about each Liaison unit 104:

A. Name—text string generated by the user, used only to help the user identify it locally
B. Full pathname of the file containing the object reference to its CORBA interface The Content Provider unit 102 can also automatically generate a unique identification number for each Liaison unit 104, to be used as a local identifier. (The CORBA object reference serves as a unique global identifier.) This can be done by generating a 64-bit number with a random number generator. Such a number will be unique with a very high probability.

The Content Provider unit 102 can store this information in a relational database such as Microsoft Access® or Microsoft SQL Server, or just in a file.

FIG. 15 illustrates a possible graphical user interface (GUI) screen for the Content Provider unit 102 to maintain information about Liaison units 104. To get to this screen, the user can click on the View menu button 1224 in the usual place for Windows applications, and select Broadcasters from the menu 1226 that is displayed by this click. This screen can have a panel 1202 that displays a list, by name, of the Liaison units that have been defined, and provides the usual interface for the user to edit items in the list, delete items from the list, and add items to the list. When a user clicks on a Liaison unit name in the list, it can be highlighted in some way 1204, and the information about the Liaison unit can be displayed in another panel 1206 The name can be an editable field 1208, the ID number can be a non-editable field 1210, and the CORBA server object reference for the Liaison unit 104 can be an editable field 1212 with an optional "browse" function invoked by a control 1214. There can be a Save button 1216 and a Cancel button 1218 for the user to save edits or cancel them. To add a new item to the list, the user can click on the New Broadcaster item 1504 in the File menu 1502.

The unique identification number could be generated automatically when a new item is created.

Well known software methods can be used to develop such a user interface and the associated software to maintain the underlying stored data about the Liaison units.

2.1 Maintaining Information About Accounts

Each account can represent a Content Provider that has arranged with one or more Broadcasters to broadcast data, typically under some kind of contractual agreement. The following information can be maintained for each account:

A. Globally unique identification number—a randomly generated 64-bit number
B. Long name of the account (typically the name of the content provider represented by the account)
C. Short name of the account (typically an abbreviated name of the content provider)
D. Technical contact information for the account—name, address, phone number, email address, etc.
E. Business contact information for the account—name, address, phone number, email address, etc.
F. List of Broadcasters broadcasting data for the account, with the bandwidth profile allocated to the account by each one—showing amount of various categories of bandwidth available for use by the account, where the amount of each may vary with date and time. Note: The different categories of bandwidth may be based on different priority levels, or on "guaranteed" versus "opportunistic" designations, or on a combination of the two, or perhaps on other factors. (Usually the total bandwidth in a DTV broadcast stream is divided up among data broadcasting and other applications, such as TV programs. There is often a certain amount of "guaranteed" bandwidth left over for data broadcasting after allowing enough for the TV programs, which may vary by date and time, depending on the number of channels offered and other factors. There is often additional "opportunistic" bandwidth available for data broadcasting, which may vary on a second by second basis, depending on the detailed characteristics of the moving pictures and how much they can be compressed while retaining acceptable quality.)

Each Liaison unit 104 can have ultimate control over the accounts it recognizes and the bandwidth profile it allocates to each one, since an account can represent a contract with the broadcaster. Thus, an account can be created by a Liaison unit 104 and conveyed to the Content Provider unit 102, or a proposed account can be created by a Content Provider unit 102 and sent to one or more Liaison units 104 for approval. Similarly, deletions of accounts or modifications of bandwidth allocations can be made by a Liaison unit 104 and conveyed to the Content Provider unit 102, or they can be proposed by the Content Provider unit 102 and approved by the Liaison unit 104. In the case of an account that is broadcasting data through several Liaison unit 104s, it might work best in practice for the account to be created at the Content Provider unit 102 and then sent to each of the Liaison units 104 for approval (and possible revision) of the bandwidth allocations, to make sure that all of the Liaison units 104 get the account number right. Also, although each Liaison unit 104 can control whether or not it accepts an account and the bandwidth it allocates to an account, the Content Provider unit 102 can control the account name and contact information it uses for each account.

This section describes how a Content Provider unit 102 can maintain information about accounts. The next section describes how a Content Provider unit 102 can synchronize its information with a Liaison unit 104.

Figure 13:
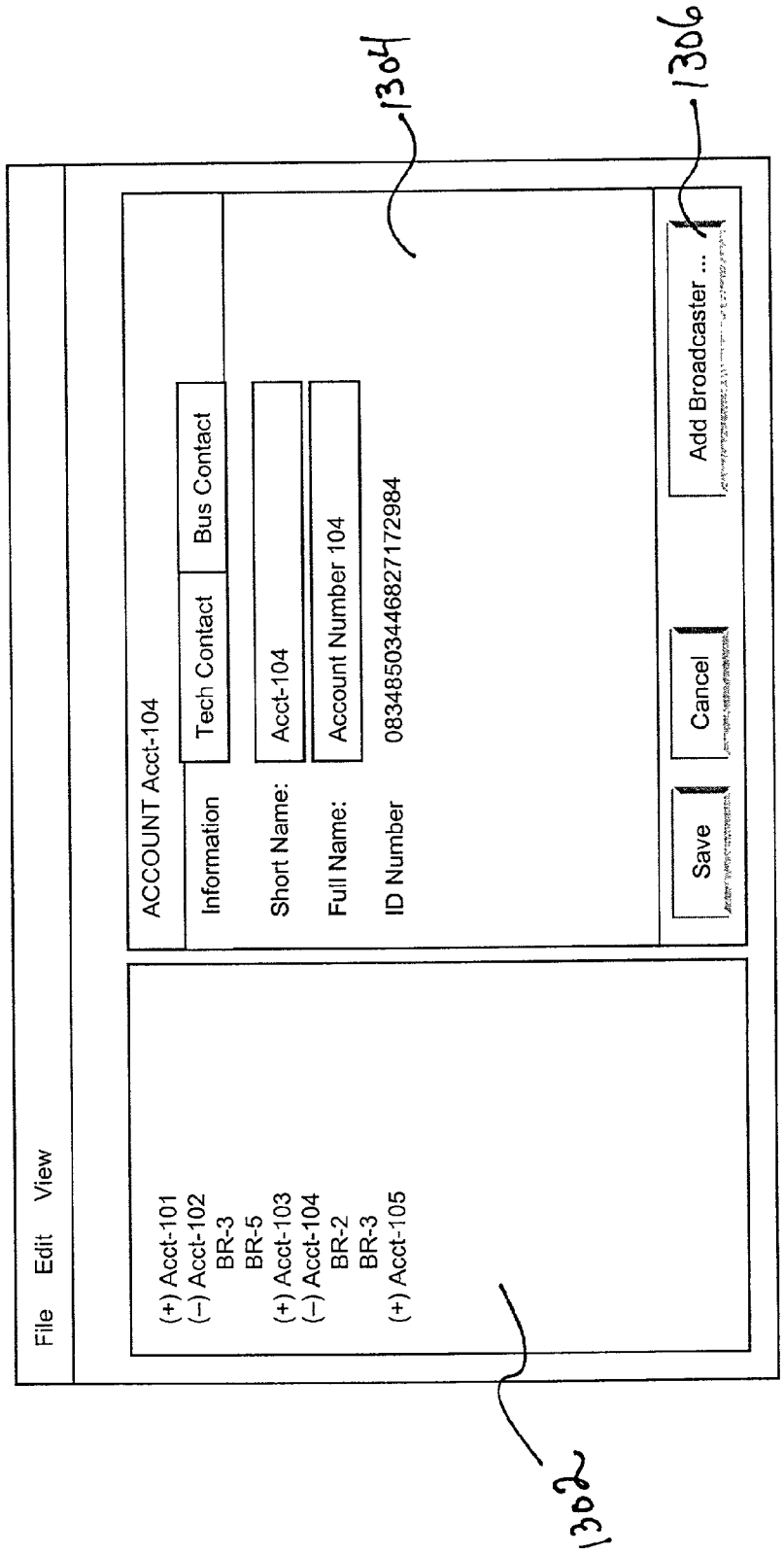
FIG. 13 shows a possible user interface screen at a Liaison unit 104 for maintaining basic information about an account, where an account represents an enterprise that has been allocated a bandwidth profile for broadcasting its content.
Figure 14:
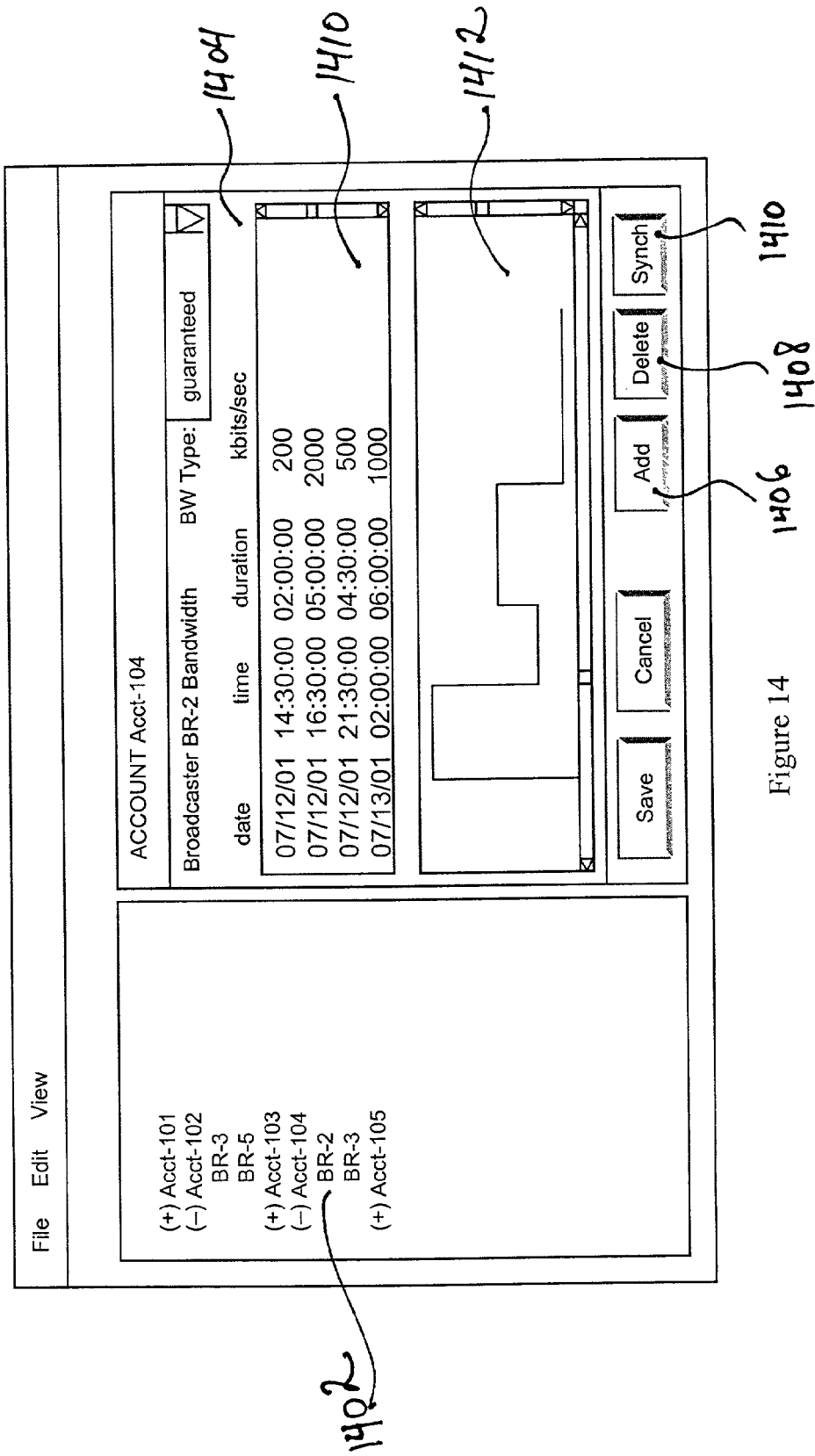
FIG. 14 shows a possible user interface screen at a Liaison unit 104 for generating a bandwidth profile to allocate to an account, and for viewing a bandwidth allocation profile request from a Content Provider unit 102.

FIG. 13 illustrates a possible GUI for maintaining account information. It can display a list 1302 of all the existing accounts, labeled by short account name, and provide the usual interface for maintaining the list—editing items, adding items, deleting items. If the user clicks on an account in the list, a panel 1304 could appear with tabs allowing editing of basic account information, technical contact information, and business contact information. The identification number for each account could be generated automatically when the account is created and made non-editable, and the name and contact information could be created and edited by the user. Each account in the list could have a small icon next to it, such as a plus sign (+), and if the user clicks is on the icon, the list could expand to show below the account a sub-list of the Liaison units 104 that broadcast data for that account. To add Liaison units to this list, the user could click on an "Add Broadcaster" button 1306, and a pop-up window could appear for the user to select a Liaison unit from the list of Liaison units that have been defined as described above. If a user clicks on a Liaison unit in such a sub-list, a panel could appear showing the bandwidth profile allocated to that account by that Liaison unit 104, in graphical 1412 and/or textual 1410 form, as illustrated in FIG. 14. These bandwidth allocations could be edited, as described in the next paragraph. A user could delete a Liaison unit from the sub-list 1402 by selecting the item and clicking an the Delete item 1514 in the File menu 1502.

To edit the bandwidth profile allocated to an account by a Liaison unit 104, the user could click on the desired Liaison unit 1402 in the sub-list under the desired account, and then edit the bandwidth profile in the panel 1404 that appears. There are many ways such editing could be done. One of the simplest to implement is to represent the profile by several lists 1410 of time interval allocations, corresponding to the different categories of bandwidth available. For example, there could be one list representing guaranteed bandwidth allocations, and another list representing opportunistic bandwidth allocations. The entries of each list could contain values for start date and time, duration, and bandwidth. For example, an entry in a list could be (14:30:00 Jul. 12, 2001; 2:00:00 hours; 200 kbps). This could mean that the account is allocated 200 kilobits/second of that category of bandwidth for a 2 hour period beginning at 2:30pm on Jul. 12, 2001. The entries in each could be required to be non-overlapping in time. The usual user interface could be provided for maintaining each list, with Add 1406 and Delete 1408 buttons. There could be a set of graphs showing bandwidth versus date and time for each category of bandwidth, so the user could visualize the results of the allocations. A somewhat more complex interface to implement could allow the user to edit the bandwidth allocations for each category by "point and click" operations on the graphs themselves. The basic idea is that the user could click on a position in the graph to indicate a starting date and time, then click on another position in the graph to indicate an ending date and time. A horizontal line could then appear between these two time points, and the user could drag this line up and down to the desired bandwidth level. The user could then double click on it to make it replace the previous allocation(s) for that time period. Many variations on this basic idea are possible using standard user interface methods, including the ability to zoom in and out on the graph, scroll backward and forward along the time scale, scroll up and down along the bandwidth scale, and snap to configurable grid points (such as every 5 minutes in time and every 10 kilobits/second in bandwidth).

2.2 Synchronizing Account Information With Liaison Unit 104s

The Liaison unit 104 can offer a CORBA server operation Exchange Account Info 802 for synchronizing the bandwidth allocation for any specific account. A Content Provider unit 102 can invoke this operation to (a) request that the account be added, providing all account information for the account, (b) request that the account be deleted, (c) request that the account's bandwidth allocation be modified, providing the requested new bandwidth allocation, or (d) request updated information on the account. In all cases the Liaison unit 104 can acknowledge the request, and return the current information about the account. The returned information can include the current bandwidth allocation for the account, an indication whether it has changed since the last synchronization operation, and an indication of the status of the most recent previous request from the Content Provider unit 102 (approved, denied, or not yet acted on by the Liaison unit 104 user). The Liaison unit 104 can also offer a CORBA operation for synchronizing all accounts. The effect of this operation can be to synchronize all accounts for which modifications have been made by the Content Provider unit 102 user since last synchronized and all accounts that have had their allocation changed by the Liaison unit 104 user since last synchronized.

When a Content Provider unit 102 requests approval of a new account, it can send full account information, including account number, name, contact information, and requested bandwidth allocation. When it requests deletion of an account, it can send only the account number, and when it requests modification of the bandwidth allocation for an account, it can send only the account number and the new allocation profile it is requesting, in the form of lists of time interval allocations for the various categories of bandwidth.

Figure 9:
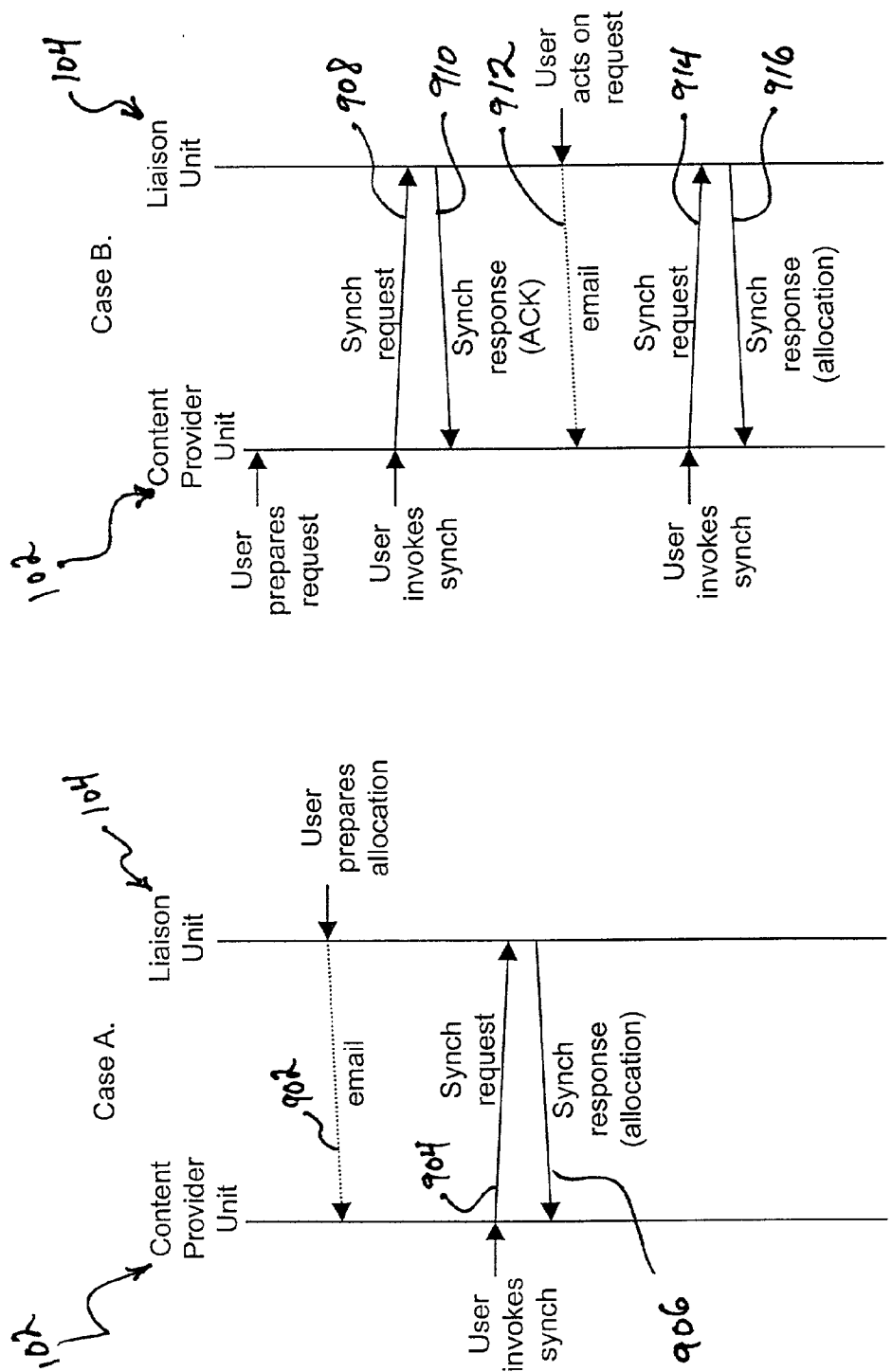

FIG. 9 shows action diagrams summarizing the interactions between a Content Provider unit and a Liaison unit for synchronizing the bandwidth allocations for an account.

The user interface for this synchronization can work as follows:

A. In the stored data for each account and each Liaison unit 104 used by that account, there can be up to three different bandwidth allocations of interest to the Content Provider unit 102 user:
  1. The most recent bandwidth allocation received from the Liaison unit 104.
  2. The most recent bandwidth allocation received from the Liaison unit 104 that the Content Provider unit 102 user has seen.
  3. The most recent bandwidth allocation that the Content Provider unit 102 user has requested.

The status of a bandwidth allocation request made by a Content Provider can be in any of four different states, as viewed by the Content Provider unit 102 user:
  1. Modified by Content Provider unit 102 user, but no request sent to Liaison unit 104 yet.
  2. Modified by Content Provider unit 102 user and request sent to Liaison unit 104, but response not received yet.
  3. Modified by Content Provider unit 102 user and request sent to Liaison unit 104, but notified that request rejected (possibly with revised allocation sent from Liaison unit 104).
  4. Modified by Content Provider unit 102 user and request sent to Liaison unit 104, and notified that request approved.

The status of a new allocation sent by a Liaison unit 104 can be in either of two states, as viewed by the Content Provider unit 102 user:
  1. Seen by Content Provider unit 102 user.
  2. Not yet seen by Content Provider unit 102 user.

When a Content Provider unit 102 user is viewing any bandwidth allocation, the status of the most recent bandwidth allocation request and the status of the most recent new allocation sent by the Liaison unit 104 can be indicated by some suitable graphical device. Moreover, if there is a request outstanding the graph 1412 could show both the current allocation and the requested allocation, distinguishable by color coding. The listing of each account in the user interface for maintaining accounts can have some indication by color coding or some other suitable graphical device whether the account has at least one associated Liaison unit 104 with an allocation in any state other than approved by the Liaison unit 104 and new allocation seen by the Content Provider user. The listing of each Liaison unit 104 in the user interface for maintaining Liaison unit 104s can have some indication by color coding or some other suitable graphical device whether the Liaison unit 104 has at least one account with an allocation in any state other than approved by the Liaison unit 104 and new allocation seen by the Content Provider user.

B. When a new Liaison unit 104 is first assigned to an account at a Content Provider unit 102, the status can be "modified, no request" for that Broadcaster, and the "old allocation" can be that no bandwidth has been allocated.

C. Any time the bandwidth allocation for an account from any Liaison unit 104 is modified at the Content Provider unit 102, the status for that account allocation can be set to "modified, no request yet". The user can click on a "synch" button 1410 in a convenient location on the screen to synchronize the allocation from the selected Broadcaster for the selected account, or a synch all BW button 1520 to synchronize the allocation from all Broadcasters for all accounts. This can cause the appropriate requests to be sent to the Liaison unit 104, and the status in each case can change to "requested, no response yet". Depending on the responses received from the Broadcaster(s), the status of the current allocation for some of the accounts from some of the Broadcasters may also be set to "new allocation, not yet seen by the Content Provider user".

D. Any time the Content Provider user views the bandwidth allocation for a particular account from a particular Broadcaster, by clicking on the Liaison unit 104 item in the sub-list under the account list, the status of the current allocation can be set to "seen by Content Provider unit 102 user".

E. A Content Provider unit 102 user who wants to find out the status of pending requests can click on the appropriate "synchronize bandwidth" button. Depending on the response received from the Liaison unit 104, the status of the allocation request and/or the user's view of the allocation may change.

2.3 Maintaining Specifications on Content to be Broadcast

Figure 10:
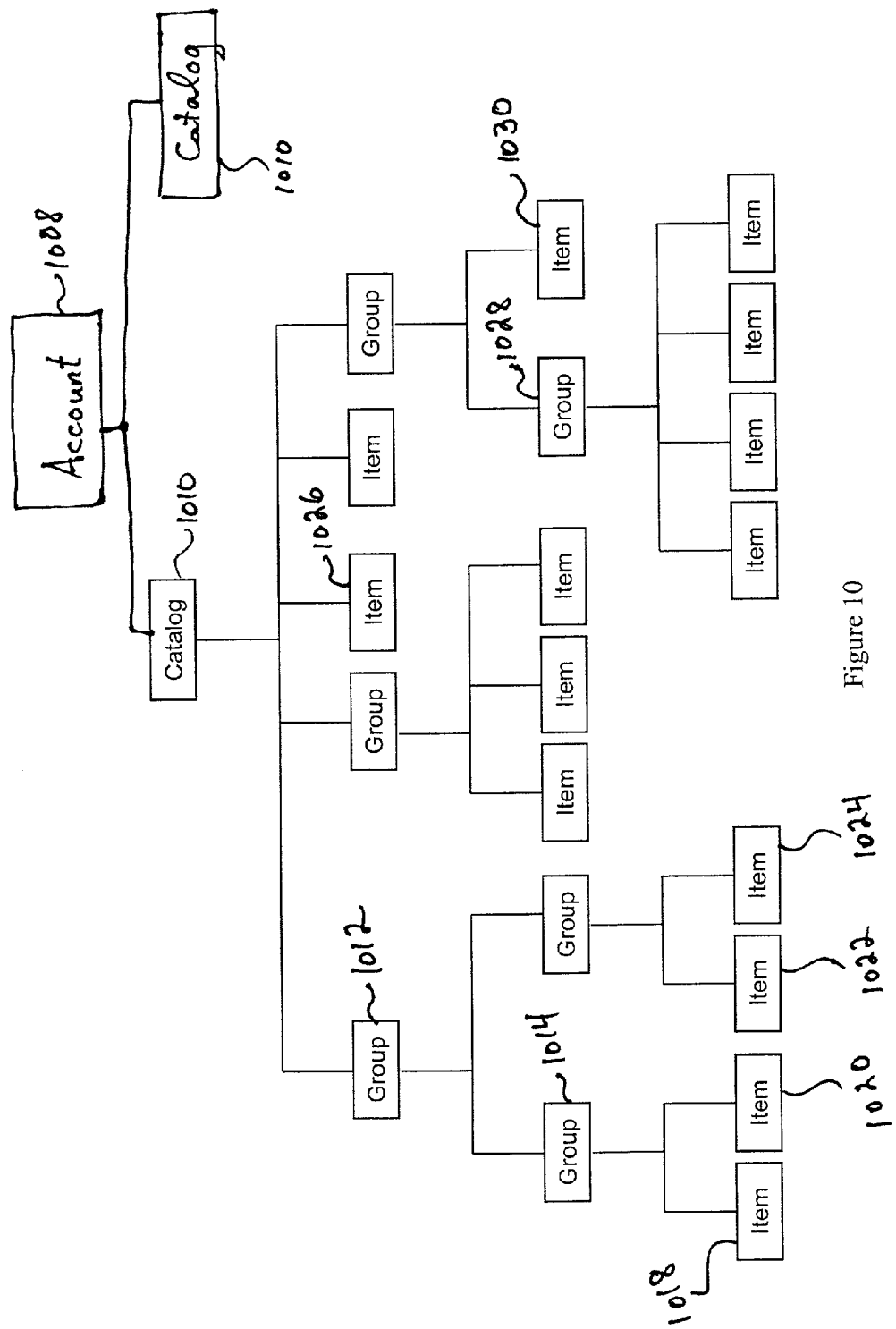
FIG. 10 illustrates a hierarchy of Content Groups and Content Items in a Content Catalog, which is a hierarchical structure containing content specification and scheduling information.

The content items to be broadcast for each account can be organized in a hierarchy. FIG. 10 illustrates such a hierarchy. At the top level of the hierarchy can be one or more "catalogs" 1010. Under each catalog can be one or more content items 1026 or content groups 1012. Under each content group can be one or more content items 1030 or content groups 1028.

A content item may include a file, a directory, or a live media stream (where a live media stream is a stream of IP multicast packets with the same destination address and port). It would be straightforward to extend this so that a content item could be the result of executing a specified database query against a specified database.

Each catalog can have the following attributes associated with it:

A. Catalog name
B. Catalog ID number (unique within the account)
C. Catalog version number
D. Date last revised
E. List of Liaison unit 104s that are to broadcast the content items specified in the catalog The catalog name is created by the user and may be edited by the user. The other catalog attributes are maintained automatically by the Content Provider unit 102. The catalog ID number can be a randomly generated 128-bit number. The catalog version number can start at 0 and be incremented every time the catalog is revised.

Each content group can have the following attributes associated with it:

A. Group name
B. Group ID number (unique within the catalog)

The group name can be created by the user and may be edited by the user. The group ID number can be maintained automatically by the Content Provider unit 102. It can be a randomly generated 128-bit number.

Each content item can have the following attributes associated with it:

A. Name—can be created by the user
B. ID number—unique within the catalog; can be a randomly generated 128-bit number.
C. Version number—can be maintained by the system; can start at 0 and be incremented with each revision.
D. Content type—can be file, directory, or live media stream (where a live media stream can be a sequence of UDP/IP packets, all with the same destination IP address and UDP port).
E. Attribute values indicating content subject matter classification
F. Content source location—can be a URL in the case of a file or directory, or a destination IP multicast address and port in the case of a live media stream.
G. Content destination location—can be a file path for a file or directory, not used for a live media stream.
H. Content IP destination address and port—for a live media stream this can be used for the UDP/IP destination address and port in the actual broadcast packets, replacing the address and port given in the content source location; for a file or directory this can be used for the destination address and port of the UDP/IP packets containing the file or files, overriding the destination address and port configured at the Liaison unit 104 for the account to which this content item belongs.
I. File encapsulation method—only valid for files and directories; designates format to be used for encapsulating files into the broadcast stream. For example, "UHTTP" could be used for a file to be sent using the UHTTP protocol of the ATVEF/DDE-1 standard, and "IP payload" could be used for a file to be sent as the payload of a single UDP/IP packet.
J. Transfer schedule—how and when it is to be transferred to the Liaison unit 104.
  1. Whether the Content Provider unit 102 delivers it to the Liaison unit 104, or the Liaison unit 104 retrieves it by itself.
  2. Transfer start date and time—no transfers take place before this date and time.
  3. Transfer end date and time—no transfers take place after this date and time.
  4. individual transfer dates and times, which can be expressed as either of the following:
    a. Time interval indicating how often the content item should be fetched.
    b. Daily transfer times.
    c. Weekly transfer days and times.
K. Broadcast schedule—when content item is to be broadcast.
  1. Broadcast start date and time—not broadcast before this date and time.
  2. Broadcast end date and time not broadcast after this date and time.
  3. List of slot definitions—where each slot can have the following parameters:
    a. Recurrence indicator—single, non-recurring active period, or recurring period that repeats hourly, daily, or weekly.
    b. Start time for active period(s). For hourly recurrence, this is the number of minutes after the hour; for daily recurrence, this is the time of day; for weekly recurrence, this is the day of week and time of day.
    c. Duration of active period(s).
    d. Count—number of times the content item is to be broadcast during each period.
    e. Bitrate (bits/second)—amount of bandwidth to be used to broadcast the content item.
    f. Interval—time interval between successive broadcasts of the content item during the period.
    A detailed definition of how these parameters are interpreted by the Liaison unit 104 appears in section 3.5.
  4. "On delivery" indicator—indicates that content item is to be broadcast as soon as it is delivered to or fetched by the Liaison unit 104; can be used as an alternative or supplement to slot definitions. A bitrate may also be specified along with this indicator.
L. Broadcast priority—can be a number between 1 and 3, with 1 being highest and 3 being lowest.
M. Whether the content item should be compressed before it is broadcast, and if so whether the compression should be performed at the Content Provider unit 102 or the Liaison unit 104, and what compression algorithm should be used. (Any of the many well known compression algorithms can be used.)
N. Whether the content item should be encrypted before it is broadcast, and if so whether the encryption should be performed at the Content Provider unit 102 or the Liaison unit 104, and what encryption algorithm should be used. (Any of the many well known compression algorithms can be used.)
O. Whether a forward error correction transformation should be applied to the content item before it is broadcast, and if so whether the transformation should be performed at the Content Provider unit 102 or the Liaison unit 104, and what forward error correction algorithm should be used. (Any of the well known forward error correction algorithms can be used.)

Figure 24:
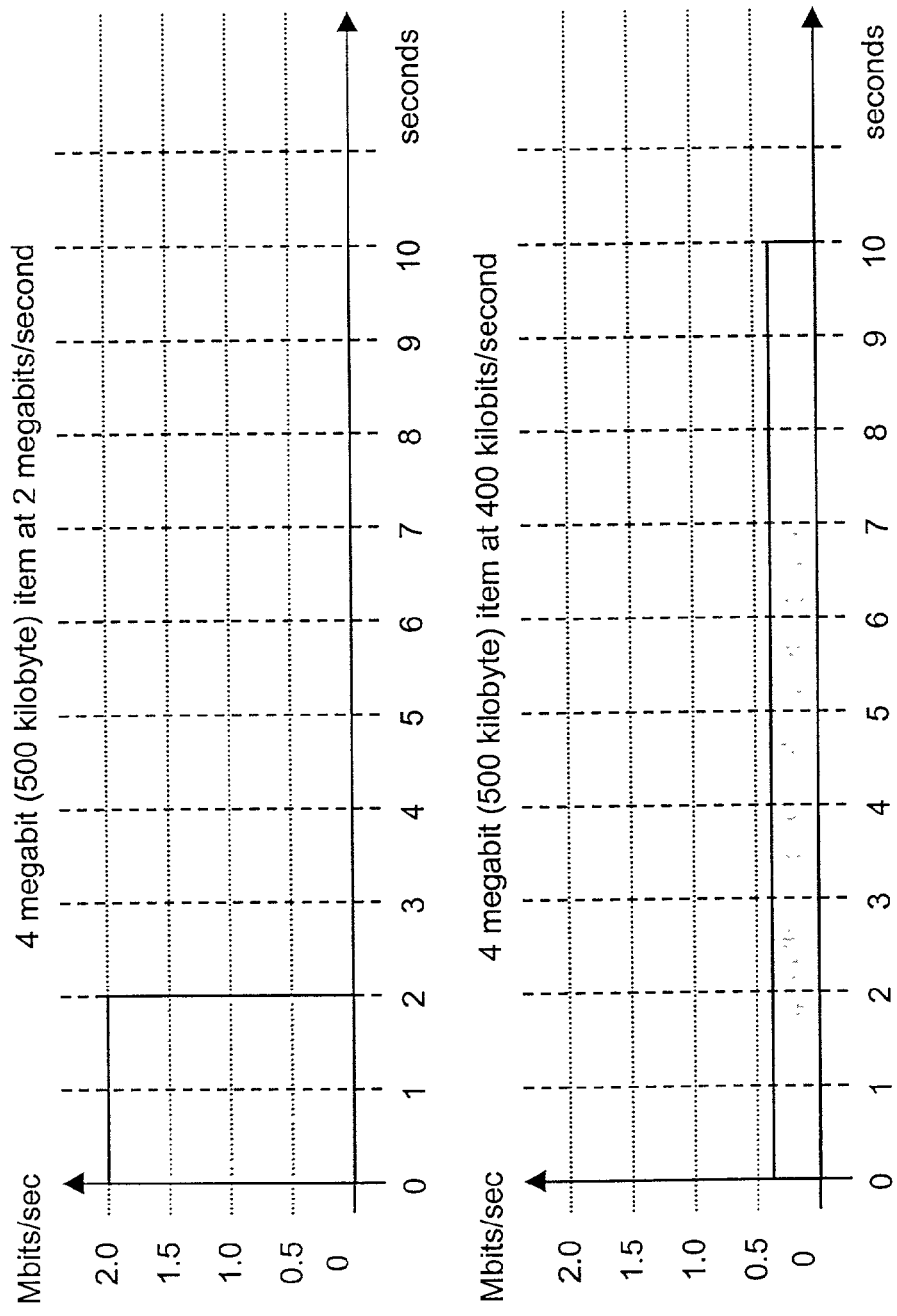
FIG. 24 illustrates the relationship between the bitrate used to broadcast a content item the time it takes to broadcast it, for a fixed size content item. The top part of the figure shows how a 500 kilobyte content item takes 2 seconds to broadcast at 2.0 megabits/second, and the bottom part of the figure shows how the same 500 kilobyte content item takes 10 seconds to broadcast at 400 kilobits/second.
Figure 25:
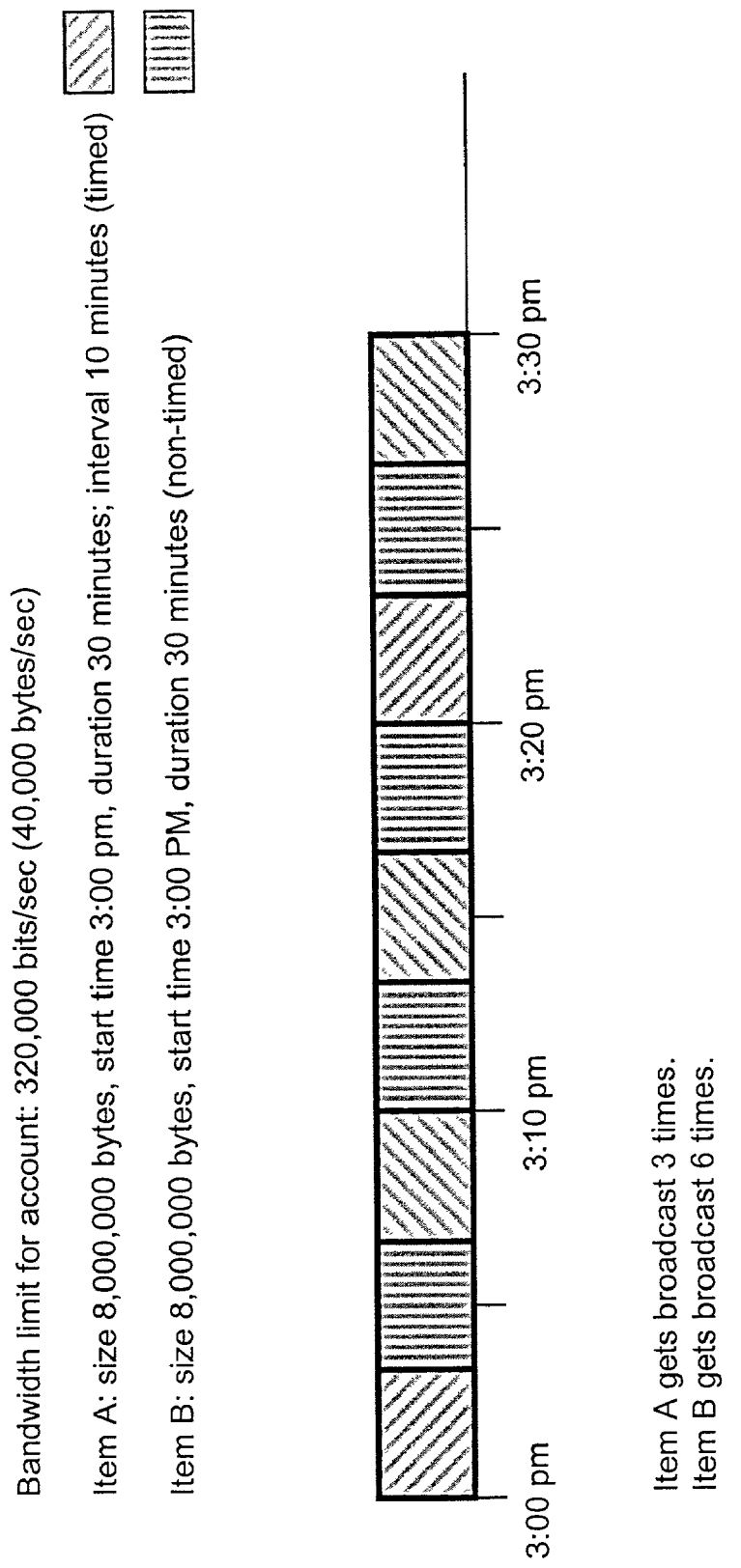
FIG. 25, FIG. 26, and FIG. 27 give examples showing how bandwidth is split between so-called "timed" and "non-timed" content items in several different mixes of timed and non-timed content.
Figure 26:
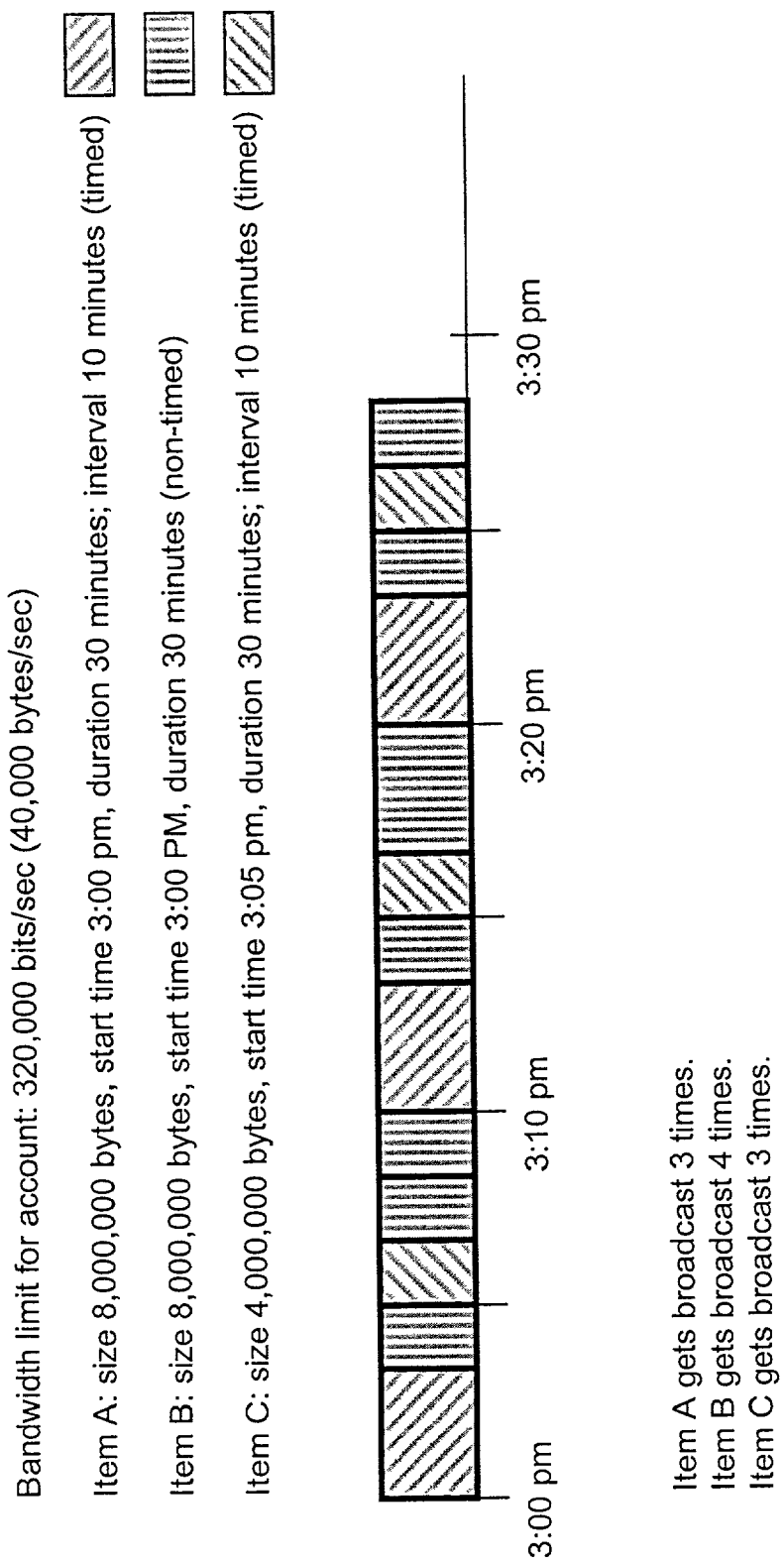
Figure 27:
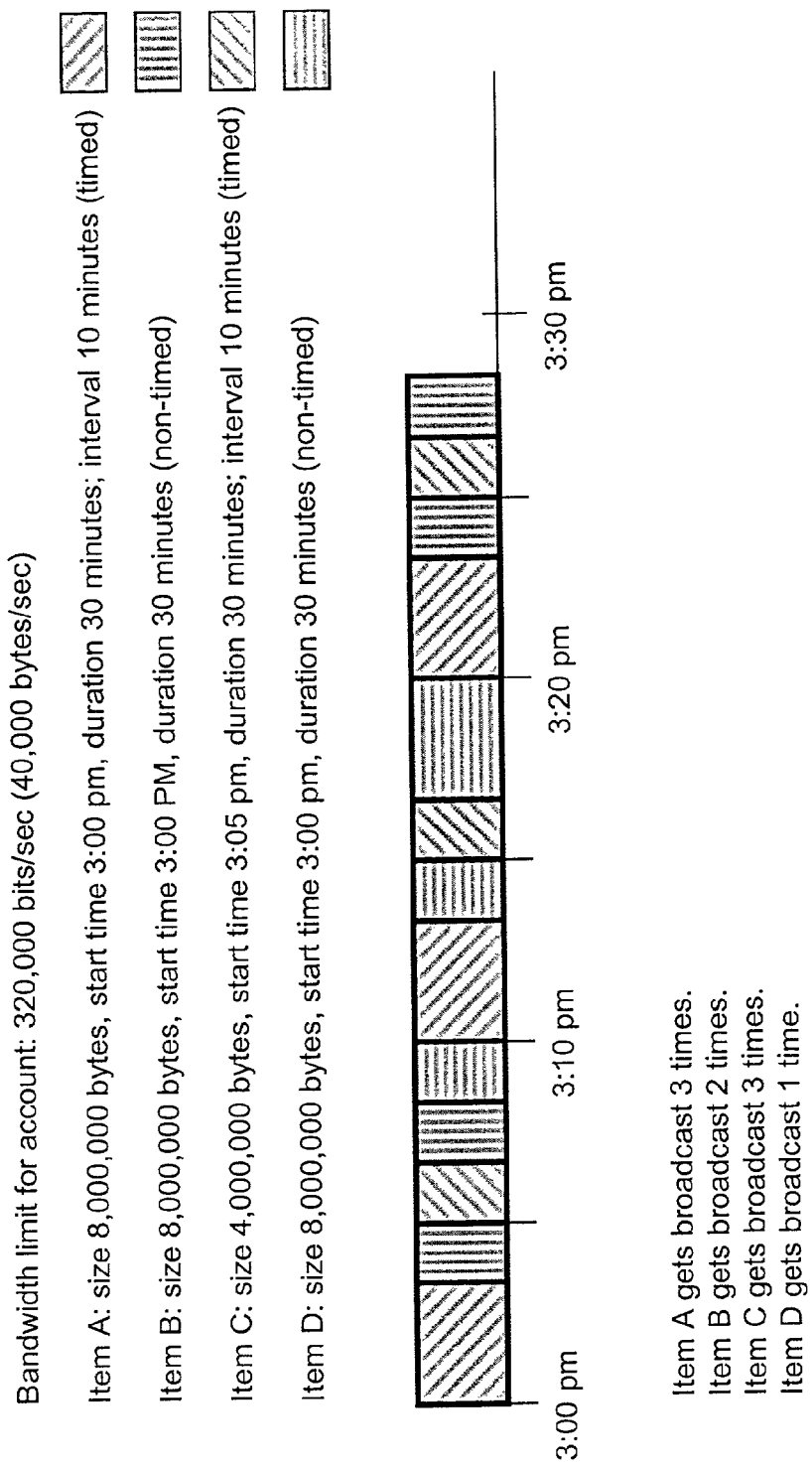

FIG. 24 illustrates the relationship among content item size, bitrate, and the length of time it takes to broadcast the item. Clearly the interval between successive broadcasts of an item cannot sensibly be less than the amount of time it takes to broadcast the item.

Figure 29:
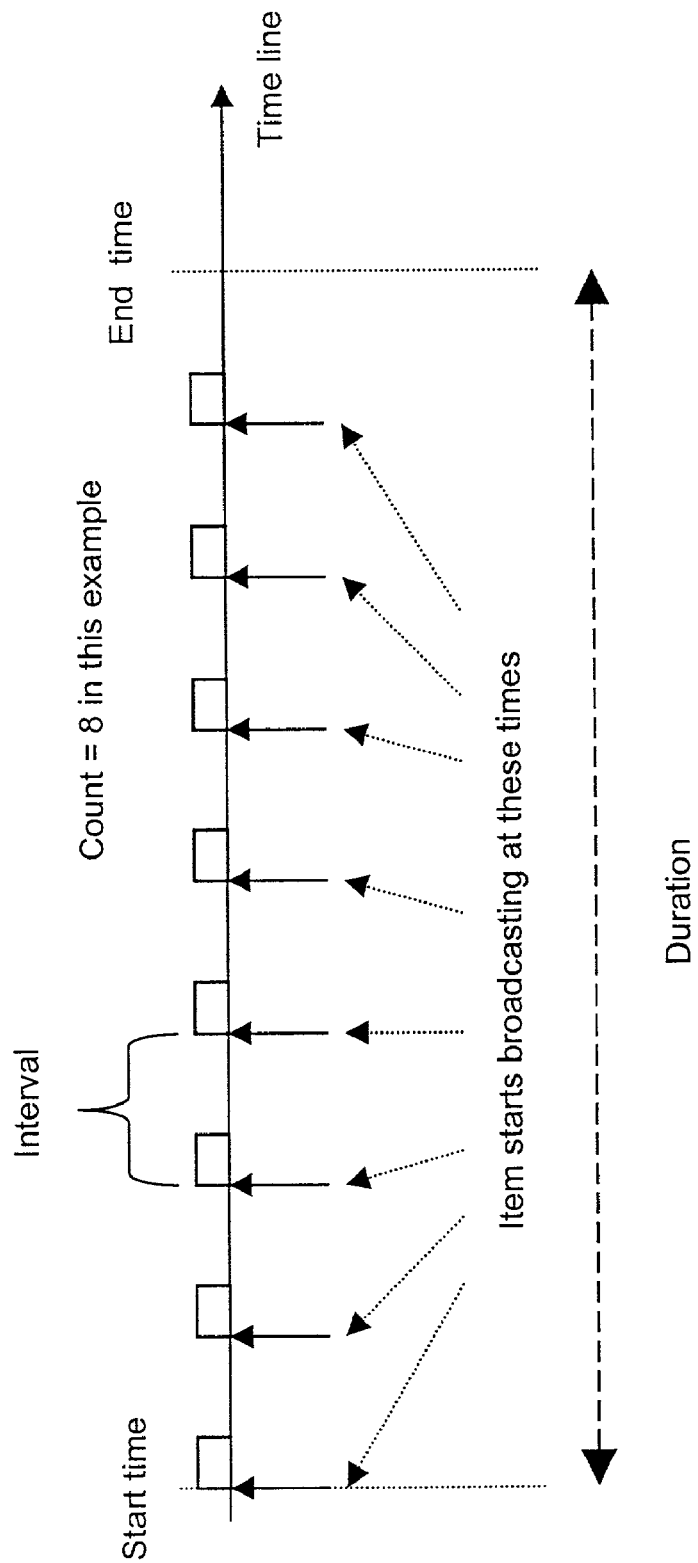
FIG. 29 illustrates the inter-relationships among the scheduling parameters start time, end time, duration, interval, and count when broadcasting a content item repeatedly.

FIG. 29 shows the relationships among the scheduling parameters start time, end time, duration, interval, and count in the schedule for broadcasting a content item within a time slot.

Figure 21:
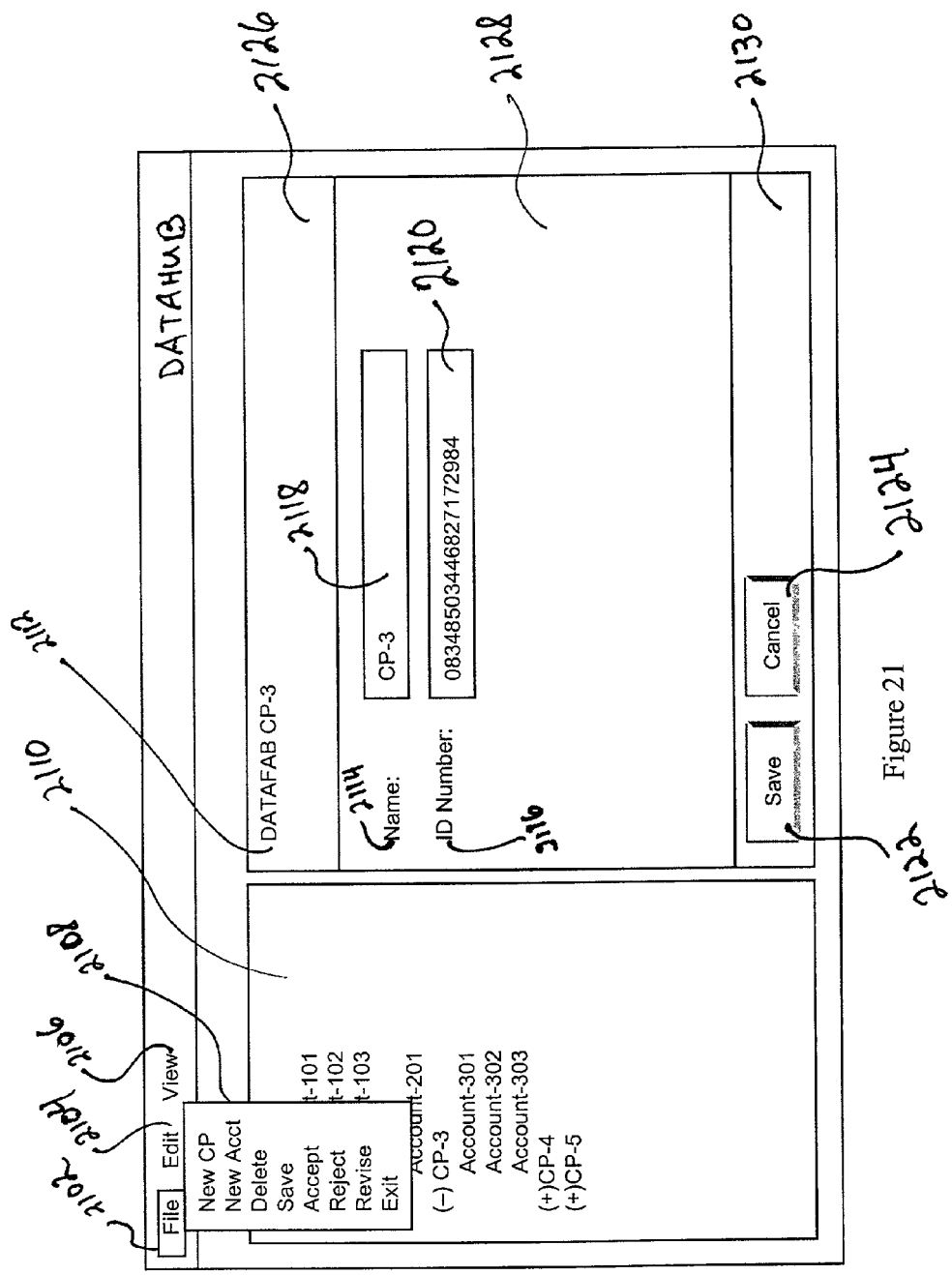
FIG. 21 shows a possible user interface screen at a Content Provider unit 102 for viewing and editing subject area attributes of a Content Item, that can be used by a user or software agent at a Data Receiver to determine whether the Content Item is of interest and should be extracted and stored.
Figure 30:
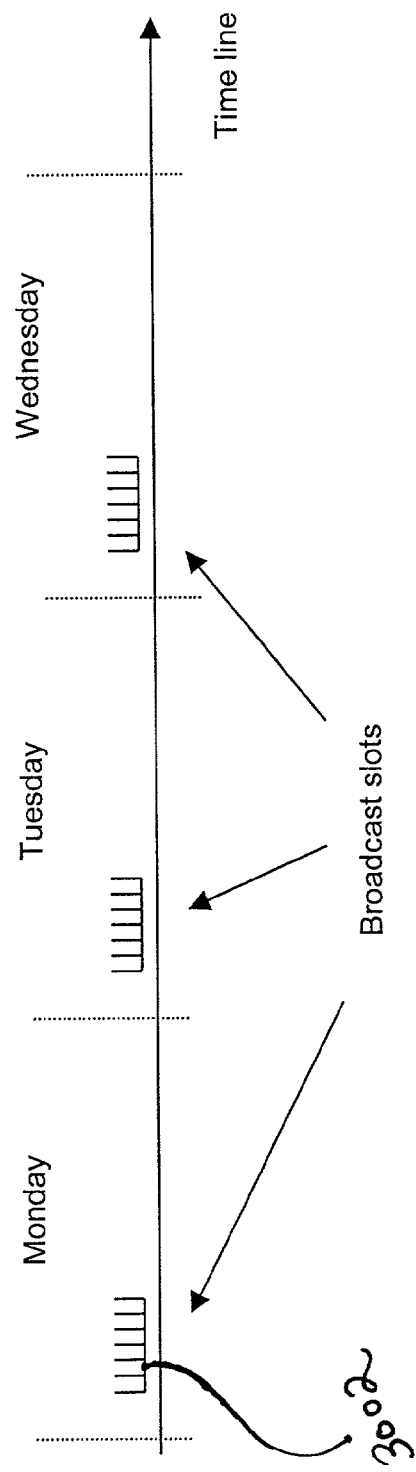
FIG. 30 illustrates the concept of a recurring broadcast slot for a content item.
Figure 31:
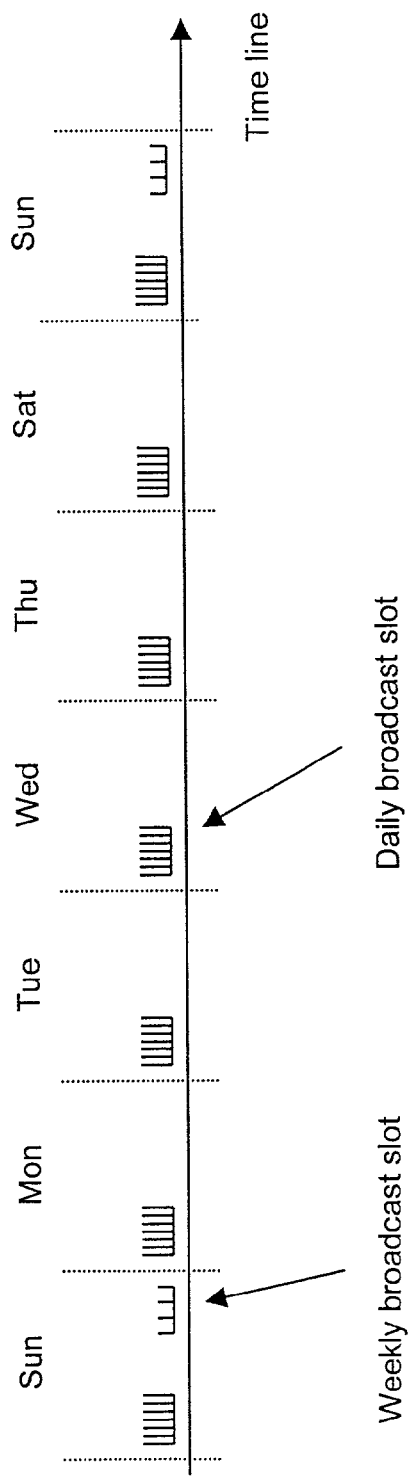
FIG. 31 illustrates a situation where the schedule for a content item includes two slots, one recurring daily and one recurring weekly.

FIG. 30 illustrates a situation where a broadcast slot 3002 is specified to recur daily. FIG. 21 illustrates a situation where two broadcast slots have been specified for a content item, one recurring daily, and one recurring weekly.

Figure 16:
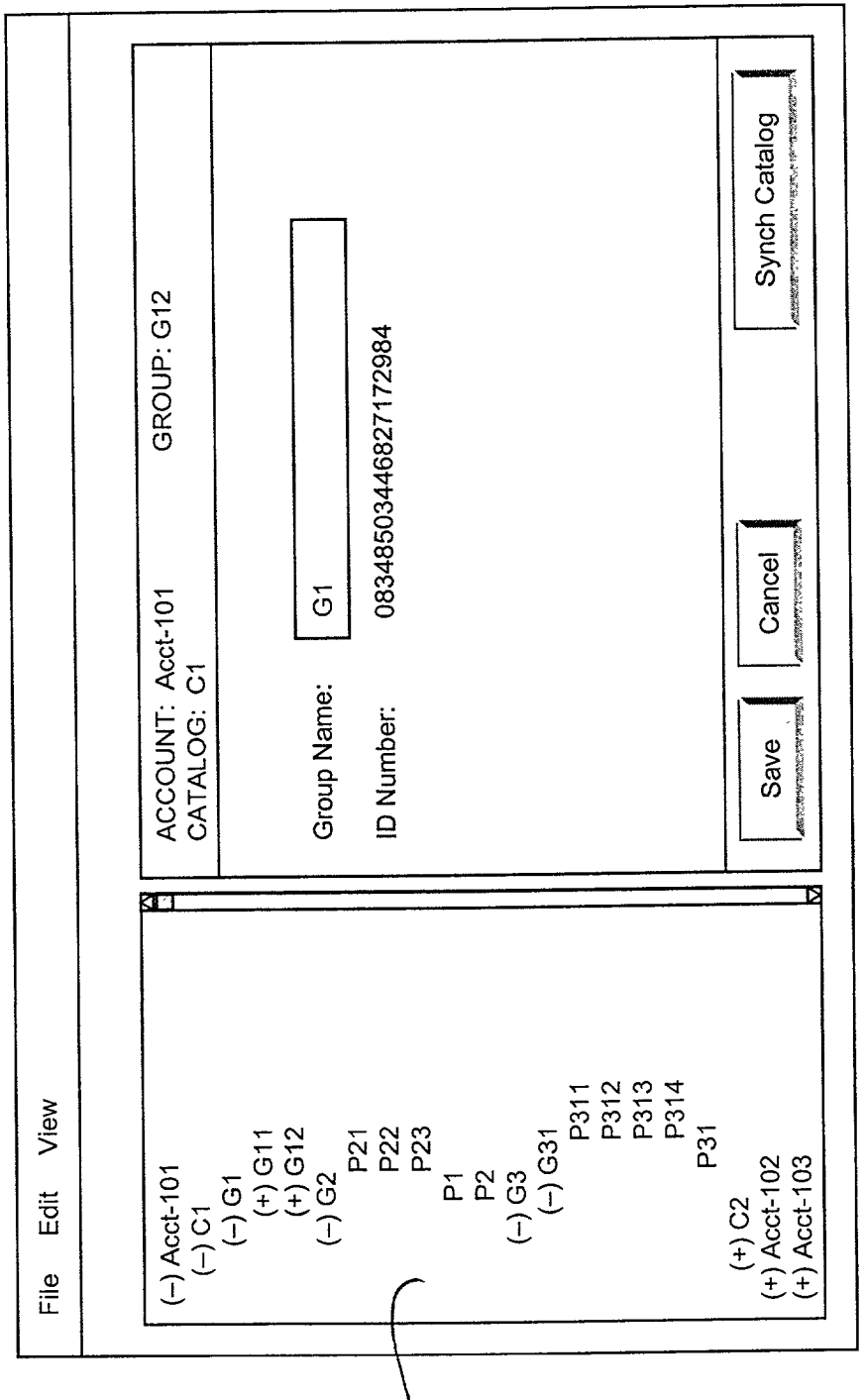
FIG. 16 shows a possible user interface screen at a Content Provider unit 102 for maintaining a list of the accounts that are managed by the Content Provider unit 102, with suitable basic information about each account.
Figure 17:
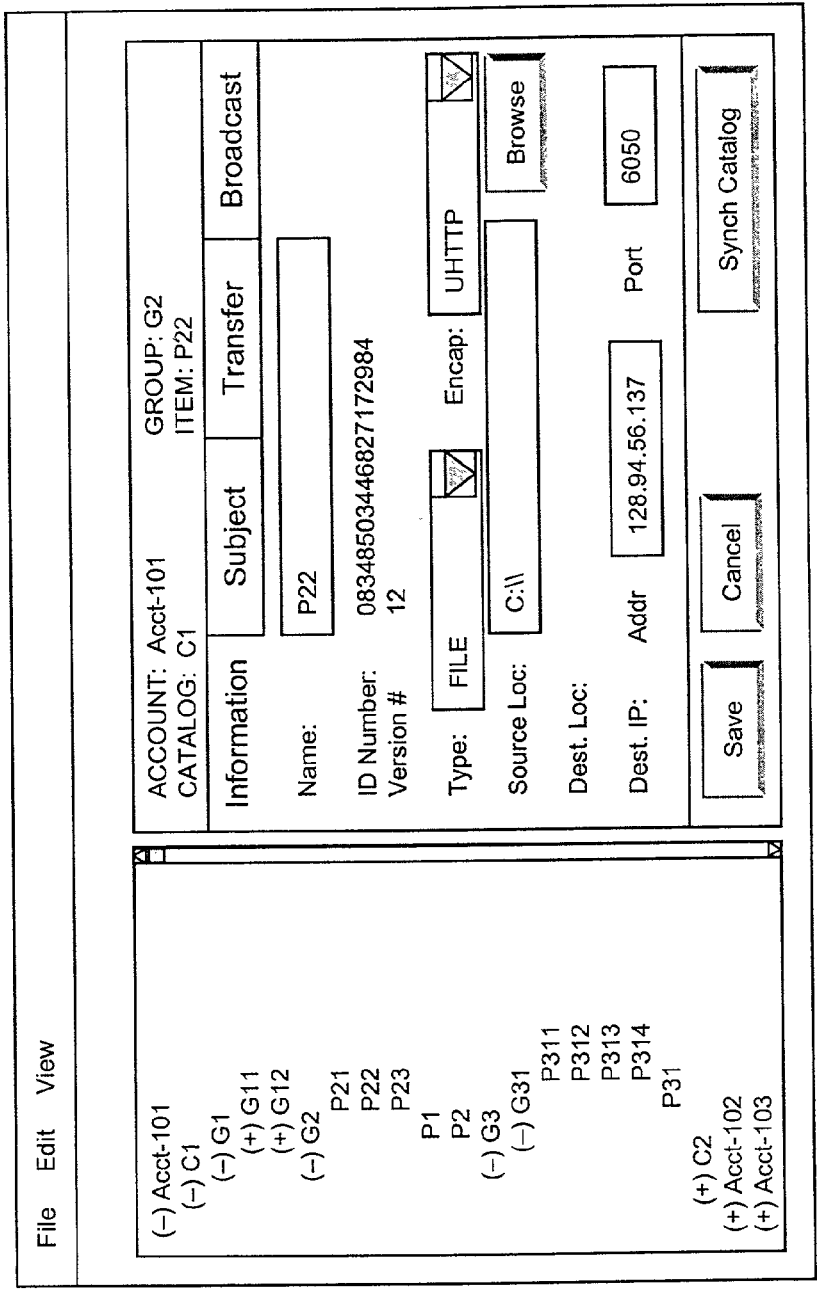
FIG. 17 shows a possible user interface screen at a Content Provider unit 102 for viewing the bandwidth allocation profiles allocated to each account by different Liaison units 104, and for generating bandwidth allocation profile requests to be sent to Liaison units 104.
Figure 18:
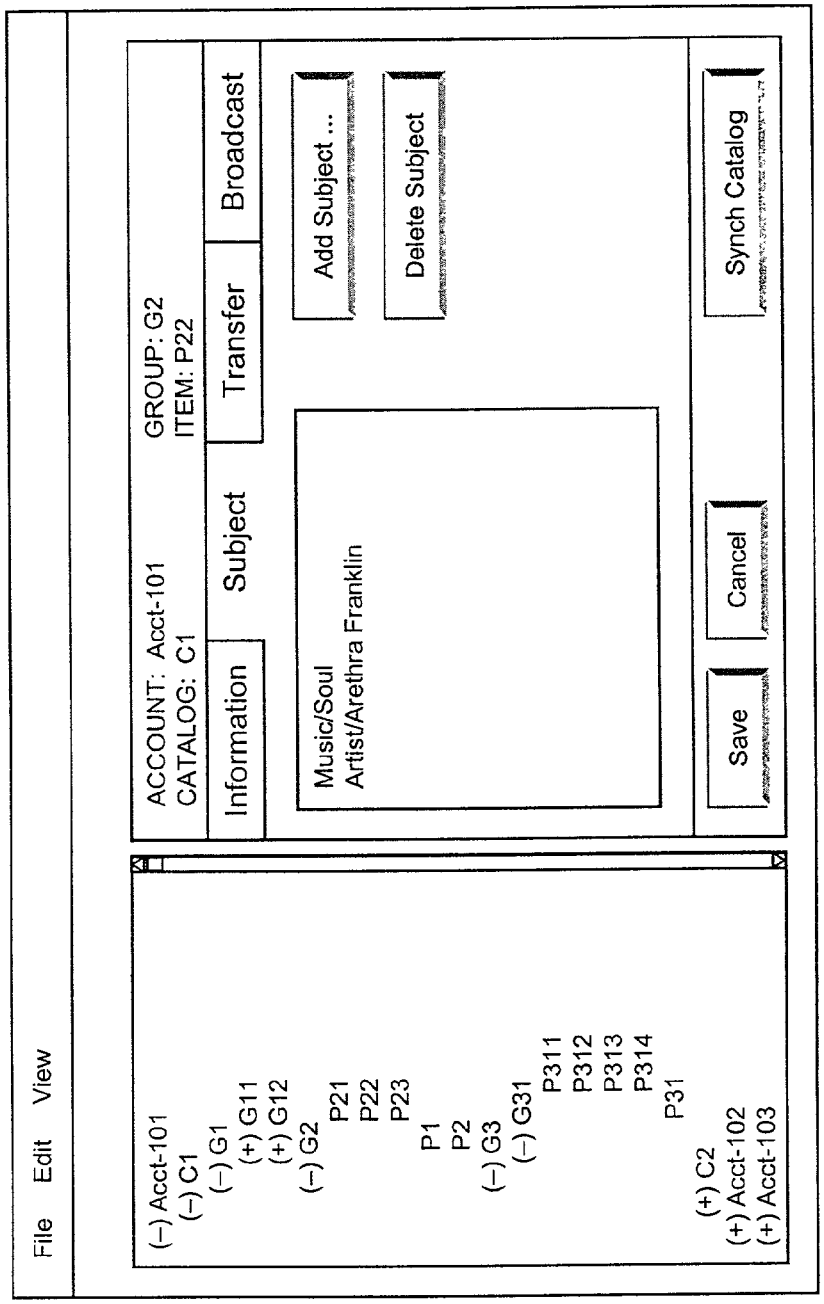
FIG. 18 shows a possible user interface screen at a Content Provider unit 102 for viewing and editing information about a Catalog, which is a hierarchical structure containing content specification and scheduling information.
Figure 20:
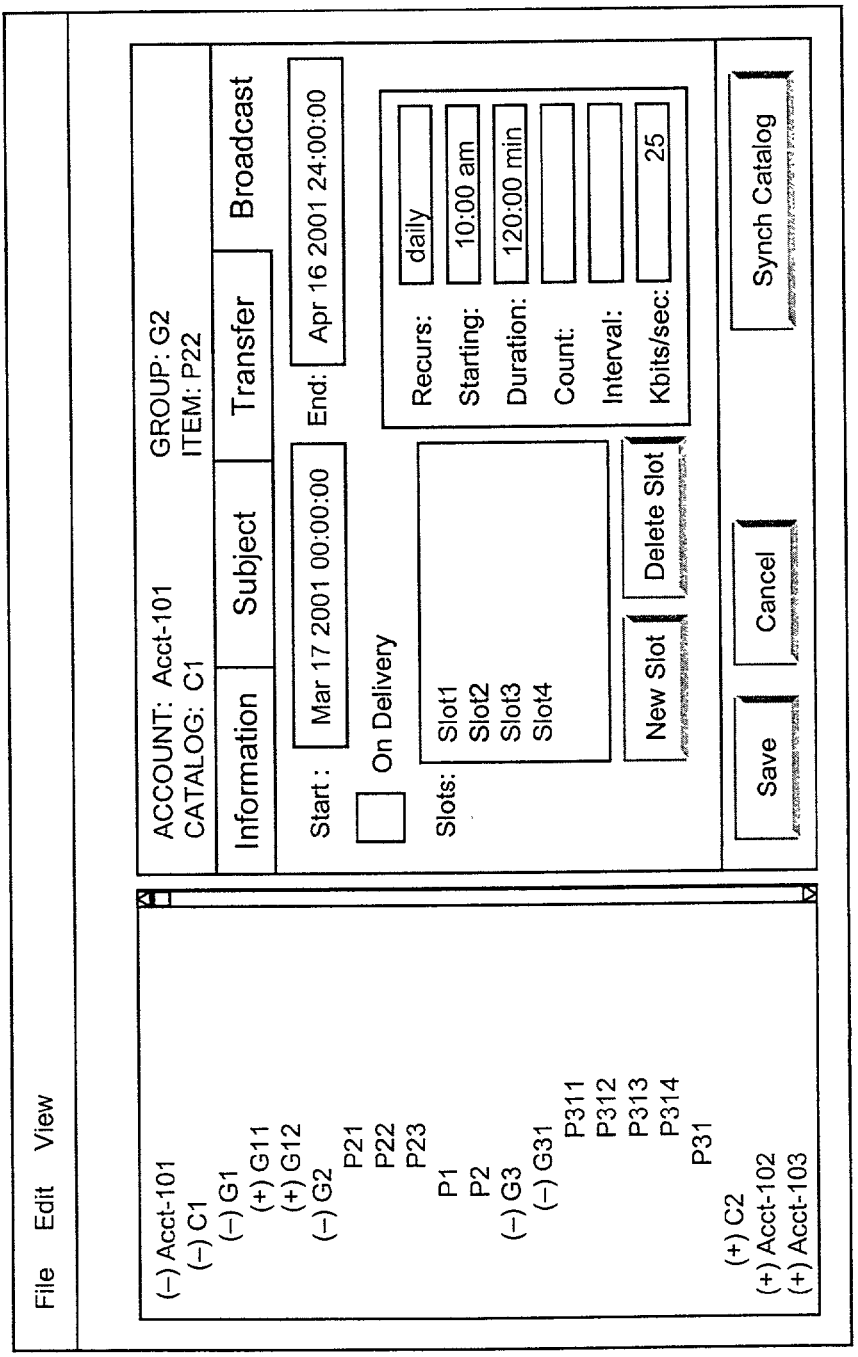
FIG. 20 shows a possible user interface screen at a Content Provider unit 102 for viewing and editing basic information about a Content Item which is to be broadcast.

The user interface for maintaining content specifications can display the hierarchy of catalogs, content groups, and content items, using a display technique similar to that used by the Microsoft Windows Explorer to display hierarchical file systems. FIG. 16 illustrates such a display 1602. The accounts then appear at the top level of the hierarchy. The user can expand or contract the sub-hierarchy under any item by clicking on an appropriate icon, such as (+) or (−) next to the item. The usual user interface method can be used to add items to the hierarchy, delete items from the hierarchy, and edit items in the hierarchy. The only variation from the usual method is that when adding an item, the user can click on an add catalog 1508, add content group 1510, or add content item 1512 button), and when an item is selected, the fields that appear in the editing panel depend on the type of item.

This data model and user interface can be modified in the obvious way to allow the specification of one or more properties at the content group or content catalog level, as well as the content item level, with the convention that values specified at any level of the hierarchy are inherited down the hierarchy unless overridden by a lower level specification. Properties that could be treated this way include content type; subject area classification; IP destination address and port; file encapsulation method; transfer mode and schedule, broadcast schedule; broadcast priority; compression indicator; encryption indicator; and forward error correction indicator.

The hierarchy for each catalog can be stored in an XML file, with tags corresponding to the items in the hierarchy and their attributes in the obvious way. Each file can also have a top-level attribute identifying the account to which the catalog belongs. When the user commits a catalog, a modified XML file for the catalog can be written to disk, overwriting the previous version.

There can also be a "synch catalog" button 1522 and "synchronize all cats" button 1516 in convenient locations on the screen. The effect of clicking on these buttons can be to send the XML file for the modified catalog or catalogs to the Liaison unit 104s that are to broadcast the content specified in the catalog or catalogs, using a server operation Accept Catalogs 804 provided by the Liaison unit 104 for this purpose. If any content items in a catalog are to be delivered to the Liaison unit 104 by the Content Provider unit 102, then a message is also sent to the delivery process Send Content 716 of the Content Provider unit 102 telling it that the catalog has changed. (See section 2.5.)

2.4 Delivering Content to the Liaison Units

When the Content Provider unit 102 is to deliver content to any Liaison units, a separate delivery process Send Content 716 can run continuously as part of the Content Provider unit 102. The path to the directory containing the 3 Catalog Store 706 for all the accounts can be provided to this process as part of initial configuration. It can parse these catalogs and get the schedule for delivering content items to the Liaison units specified for the catalogs. At the designated times it can retrieve the content items from the source locations specified in the catalogs and deliver them to the Liaison units.

Each Liaison unit 104 can provide a CORBA operation Accept Delivered Content 806 for delivery of content items to it. When a directory is to be delivered, it can be delivered as a single composite file, such as a "zip" file.

Figure 11:
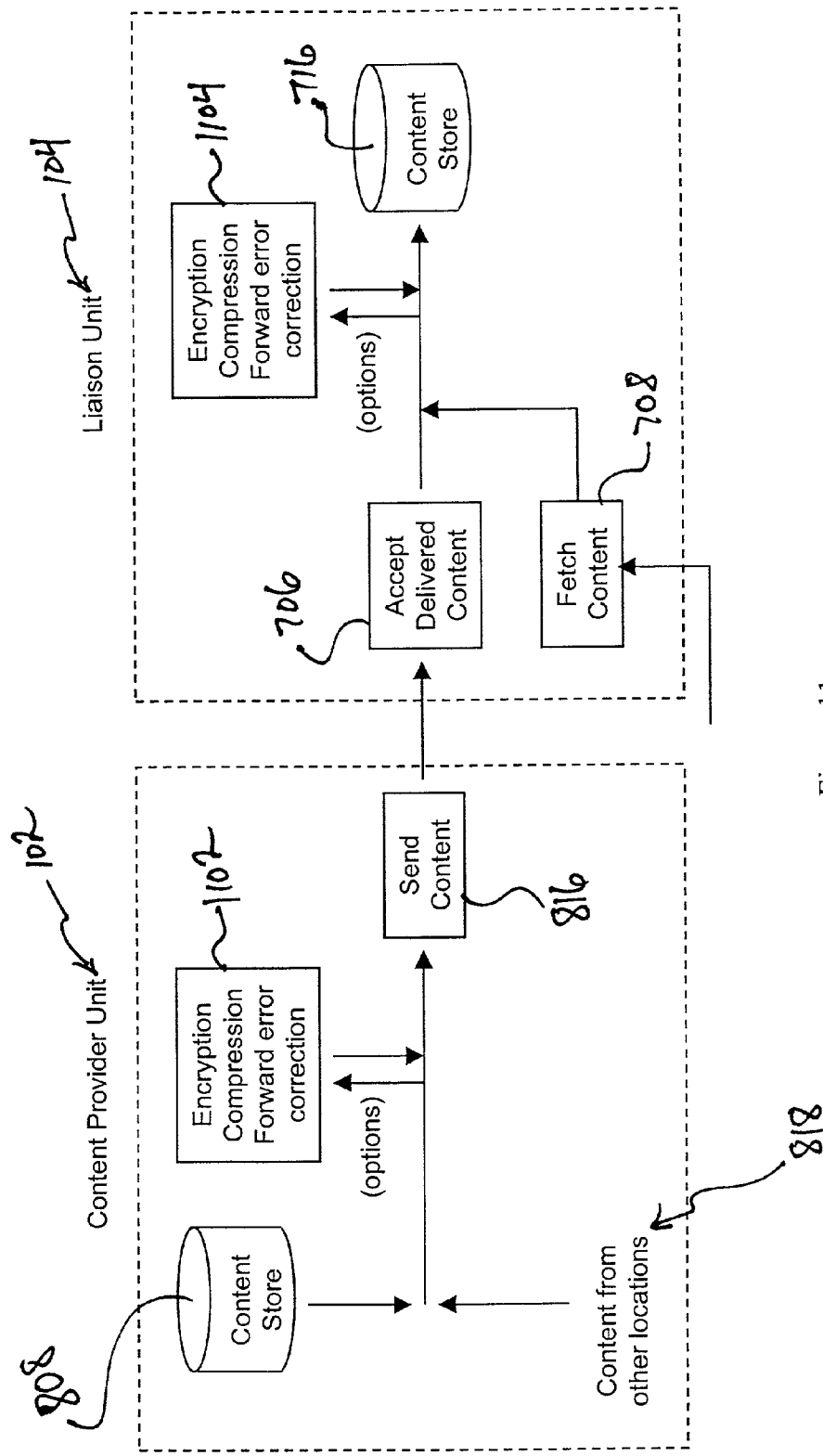
FIG. 11 illustrates the architecture for optionally performing content encryption, content compression, and/or content forward error correction transformations at either a Content Provider unit 102 or a Liaison unit 104.

If compression and/or encryption and/or forward error correction transformations are to be applied to any content items by the Content Provider unit 102, these items can automatically be flagged for delivery to the Liaison unit 104s, and these operations can be applied just before the items are delivered, as shown in FIG. 11.

3. Liaison Unit Design

A Liaison unit 104 can be implemented as software running on a Personal Computer (PC) running under the Windows NT version 4.0 operating system. The software can be written in the Java programming language. The PC can have an Ethernet adapter for the Liaison unit 104 to communicate with Content Provider units 102 via the CORBA flop protocol, with the Liaison unit 104 acting as a CORBA server. The Ethernet adapter can also be used to send content to certain types of Mixing Units 108 (multiplexers and gateways) for insertion into the broadcast stream, using the TCP/fP or UDP/IP protocols.

A Liaison unit 104 can also have other types of communications adapters, such as RS-422, DVB ASI (Digital Video Broadcast Asynchronous Serial Interface), or SMPTE 310 (Society of Motion Picture and Television Engineers standard 310M), for sending content to Mixing Units 108 (multiplexers and gateways) for insertion into the broadcast stream.

Figure 23:
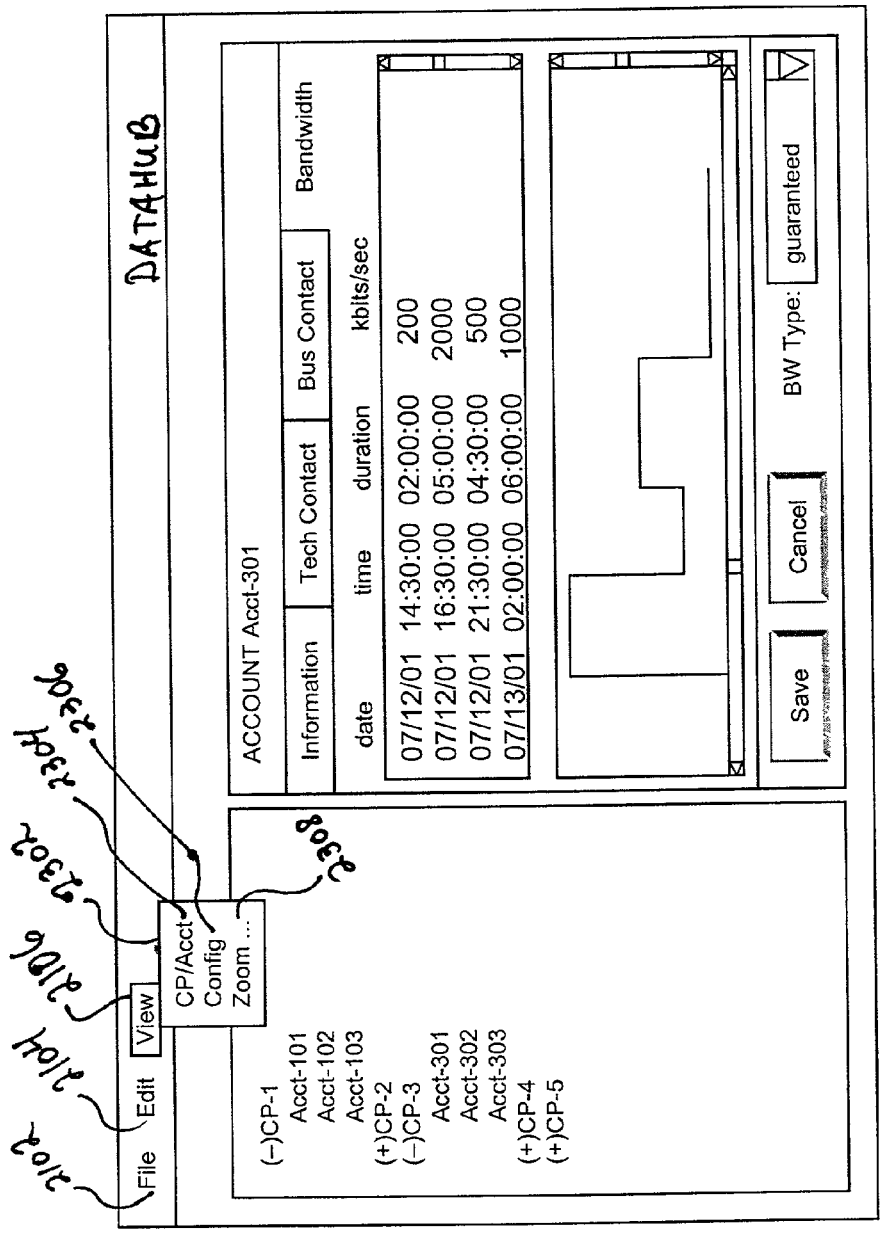
FIG. 23 shows a possible user interface screen at a Content Provider unit 102 for viewing and editing the schedule for broadcasting a Content Item.

The GUI for the Liaison unit comprising an Account Management GUI 810 and a Configuration GUI 818 can be a Windows application with File, Edit and View menu buttons at the top of the screen in the usual way. An example of the File menu 2108 that could appear from clicking on the File button 2102 is shown in FIG. 21. Typically only some choices would be available at any given time; others may be grayed out. An example of the View menu 2302 that could appear from clicking on the View button 2106 is shown in FIG. 23. It could be used to switch to a functional area of interest, for example to maintaining information about Content Provider units and accounts (CP/Acct selection 2306), or to maintaining information about various configuration parameters (Config selection 2306. It could also be used to change the zoom factor for display of bandwidth allocation graphs (Zoom selection 2308).

3.1 CORBA Server Operations

The Liaison unit 104 can offer the following operations through its CORBA server:

This operation can have as input parameter an XML page that always includes the Content Provider ID, the account ID, and an add/delete/edit/info indicator. For an add request the page can include the account name, contact information, and a requested account allocation (list of interval allocations). For an edit request the page can include the requested account allocation. The operation can have as output parameter an XML page that includes the current bandwidth allocation for the account, and whether that allocation is unchanged since the last synchronization, or was changed by the user accepting a request, rejecting a request, accepting a request with modifications, or just making a unilateral change in the absence of any request.

B. Exchange Account Info 802 with Synchronize All Accounts option

This operation can have as input parameter an XML page that includes the Content Provider ID. It can have as output parameter an XML page that includes a list of all account allocations for that Content Provider unit 102, with an indication of whether the allocation has changed since the last synchronization, and if so why.

C. Accept Catalogs 804

This operation can have as input parameter an XML page that includes the Content Provider unit ID and a list of one or more accounts, with a list of one or more catalogs for each account. Each catalog can contain a specification of content groups and content items, to replace any previous specification for that catalog, or it can contain simply a "delete" attribute, indicating that the catalog is to be deleted. The outputs of this operation can be stored in a Catalog Store 814.

D. Accept Delivered Content 806

This operation can have as input parameters the Content Provider ID, account ID, catalog ID, and content item ID of the content to be delivered, plus the content itself in the form of an octet string. (Note that this may not be a good choice for very large files or directories. It might work better for the Content Provider unit to specify that the Liaison unit 104 fetch very large files, rather than having them delivered.) If a directory is to be delivered, it can be delivered as a single composite file, such as a "zip" file.

If a broadcast schedule appears in the catalog for the content, then the content can be put in the Content Store 816, in a directory or database structure that supports using the account ID, catalog ID and content ID as retrieval paths, so that the threads performing the actual broadcasting can find them readily. If the content is identified in the catalog as "broadcast on receipt" then the files can be put into the appropriate broadcast queue 3204 immediately.

Since all interactions between a Content Provider unit 102 and a Liaison unit 104 take place through these well-defined operations, it is possible to have many different types of Content Provider units customized for many different types of specialized applications, all broadcasting data through the same Liaison units. All that is necessary is that each Content Provider unit 102 be able to invoke these operations to negotiate accounts, deliver catalogs, and deliver content if desired.

3.2 Maintaining Information about Content Provider unit 102s

The following information is maintained by each Liaison unit 104 about each Content Provider unit 102 for which it broadcasts content items:

A. Name

B. ID number

The name can be entered by the Liaison unit 104 user. It can be for local use only. The globally unique ID number can be obtained from the Content Provider unit 102 user by some out-of-band mechanism. It can be presented by the Content Provider unit 102 to the Liaison unit 104 as a parameter whenever the Content Provider unit 102 invokes an operation (synchronize, etc.) at the Liaison unit 104, and can be used by the Liaison unit 104 to validate the source of the request.

FIG. 21 illustrates a GUI screen that could be used to maintain this information.

3.3 Maintaining Information About Accounts

The Liaison unit 104 can maintain the following information about each account for which it broadcasts content items:

A. Globally unique identification number—can be a randomly generated 64-bit number B. Long name of the account (typically the name of the content provider represented by the account)

C. Short name of the account (typically an abbreviated name of the content provider)

D. Technical contact information for the account—name, address, phone number, email address, etc.

E. Business contact information for the account—name, address, phone number, email address, etc.

F. ID number of the Content Provider unit 102 to which the account belongs

G. Bandwidth allocation for the account

H. Destination IP address and port number—can be used as the default destination address and port for UDP/IP packets containing encapsulated files for this account, when no destination address and port is specified for a content item by the Content Provider unit 102 in the catalog specifying the files.

I. Output interface (DVB ASI, RS-422, SMPTE-310, UDP/IP, TCP/IP) for this account—to be used to deliver the content to a Mixing unit 108 (multiplexer or gateway).

J. MPEG-2 packet ID (PID) for this account—to be used if the Liaison unit 104 is packing UDP/IP packets into MPEG-2 transport stream packets and delivering them to a Mixing unit that is a multiplexer, rather than an IP-to-MPEG gateway.

The user interface and the underlying data storage for this information can be very similar to that used for maintaining account information at the Content Provider system. FIG. 22 and FIG. 23 illustrate GUI screens that could be used to maintain this information. The user interface can present a list of all the Content Provider unit 102s that broadcast content through this Liaison unit 104. The user can click on an icon next to each Content Provider name, such as a (+) symbol, to display the list of accounts associated with that Content Provider unit 102. Accounts can be added, deleted, and edited in the usual way. The only major difference is the way that the bandwidth allocation negotiation process works from the Liaison unit 104 side. Whenever the Liaison unit 104 creates a new account or modifies the bandwidth allocation for an account, that becomes the definitive new information once it is saved. When a new allocation request for an account arrives from a Content Provider unit 102, color coding of the entries in the list or some other suitable graphical device can be used to indicate to the user that there is a request pending for that account and that Content Provider unit 102. The user can accept the modification, reject it entirely, or modify it and accept it as modified. Whatever decision the user makes can become the new definitive information for the account, once it is saved. The results of the decision are conveyed to the Content Provider unit 102 the next time it synchronizes the bandwidth allocation for the account.

3.4 Fetching Content to be Broadcast

Through the Accept Catalogs operation 804, the Liaison unit 104 gets a list of catalogs specifying the content items to be broadcast and the schedule for fetching them. The Liaison unit 104 can have two threads that handle the fetching 808. One of them can maintain a list of the content items to be fetched during the next 2 hours, say, sorted chronologically. It can update this list at appropriate intervals, perhaps once an hour, or whenever a new version of a catalog arrives or a catalog is deleted. (Developing the software to do this is tedious, but straightforward.) At the specified times the other thread can fetch the content items via some appropriate protocol, perhaps FTP. (The use of FTP rather than HTTP provides better support for fetching of directories.) Fetched items that have a broadcast schedule for them in the catalog can be put in the Content Store 816, in a directory or database structure that supports using the account ID, catalog ID and content ID as retrieval paths, so that the threads performing the actual broadcasting can find them readily. If the content is identified in the catalog as "broadcast on receipt" then the files can be put into the appropriate broadcast queue 3204 immediately.

3.5 Broadcasting Content

The Liaison unit 104 can have one thread for each account that goes through all the catalogs for the account, develops the broadcast schedule for the data items specified in them, picks up the data items from the Liaison unit 104 cache (where they have been put by either the "deliver content" CORBA server operation described in section 3.1 or the content fetching thread described in section 3.5), puts any descriptive header on each file that may be dictated by the file encapsulation protocol, performs any necessary compression, encryption, forward error correction, and/or encapsulation transformations, and puts them on a broadcast queue when it is the right time for them to be broadcast.

FIG. 39 illustrates the encapsulation of a file using the ATVEF/DDE-1 UHTTP protocol. The descriptive header conforms to the generic format of an HTTP header, as specified by IETF RFC 2616 ("Hypertext Transfer Protocol—HTTP/1.1"). Extra fields specific to this application can be provided, such as Content-Location, Content-Size, Content-Type, Last-Modified, Expiration-Date, Account-ID, Catalog-ID, and Content-ID. The last three of these fields allow a Content Receiver unit to match up the files appearing in the broadcast stream with entries in the catalogs.

FIG. 40 illustrates the encapsulation of UDP/IP packets into MPEG-2 transport stream packets, using the addressable sections encapsulation defined in the DSM-CC standard (amendment 2 to ISO/IEC 13818-6) and included in the ATSC Data Broadcast Standard (ATSC doc. A/90).

Another "broadcast thread" for each account takes content items off the broadcast queue and sends them out. Note that the items on the broadcast queue can be taken off in increments of individual UDP/IP packets or MPEG-2 transport stream packets, rather than complete files, since the files have already been encapsulated before they are put into the queue. In order to understand how to handle the timing for putting items on the broadcast queue and taking items off the broadcast queue, it is important to understand how the scheduling parameters for each slot are interpreted.

There are two types of slot schedules for content items that include files:

(1) If the broadcast interval for the product has been specified, either by specifying the interval directly or by specifying both the count and duration, this can be referred to as a timed file product. Such a product can be broadcast at the slot start time and at the specified intervals after that, until the specified count or duration is reached. (The interval should be measured from the target time of broadcast of the previous instance, rather than from the actual broadcast time. I.e., if a broadcast of a product is delayed because of contention, the target time for the next broadcast of the product should not be delayed accordingly. It should be scheduled as if the previous broadcast had gone out on time.)

(2) If the broadcast interval for the product has not been specified—i.e., only the count was specified, or only the duration was specified, or none of the broadcast parameters was specified—this can be referred to as a non-timed file product. Such a product can be broadcast at the slot start time and periodically after that at non-deterministic times, until the specified count or duration is reached.

With this context, the tables in FIG. 28A and 28B show how the scheduling parameters can be interpreted so as to arrive at a valid schedule for any combination of parameter specifications, conforming precisely to the specifications when the values given are consistent, and making reasonable assumptions about the intent of the user at the Content Provider unit when the values given are not consistent.

It is clear from the interpretations given in the schedule that the file broadcast schedule can contain timed content items that are to be broadcast at specific times, and non-timed content items that are to be broadcast at non-specific times.

The Liaison unit 104 can also have a thread for each live media stream to be broadcast, created when it is time to begin broadcasting the stream, and terminated when it is time to stop broadcasting the stream. The thread can listen on the UDP/IP address and port specified as the source location for the stream, read any packets that arrive, and put them on a queue to be broadcast.

The catalogs themselves can also be included in the broadcast stream, to give the Content Receiver units 3402 the specifications and schedules for the broadcast content.

Figure 32:
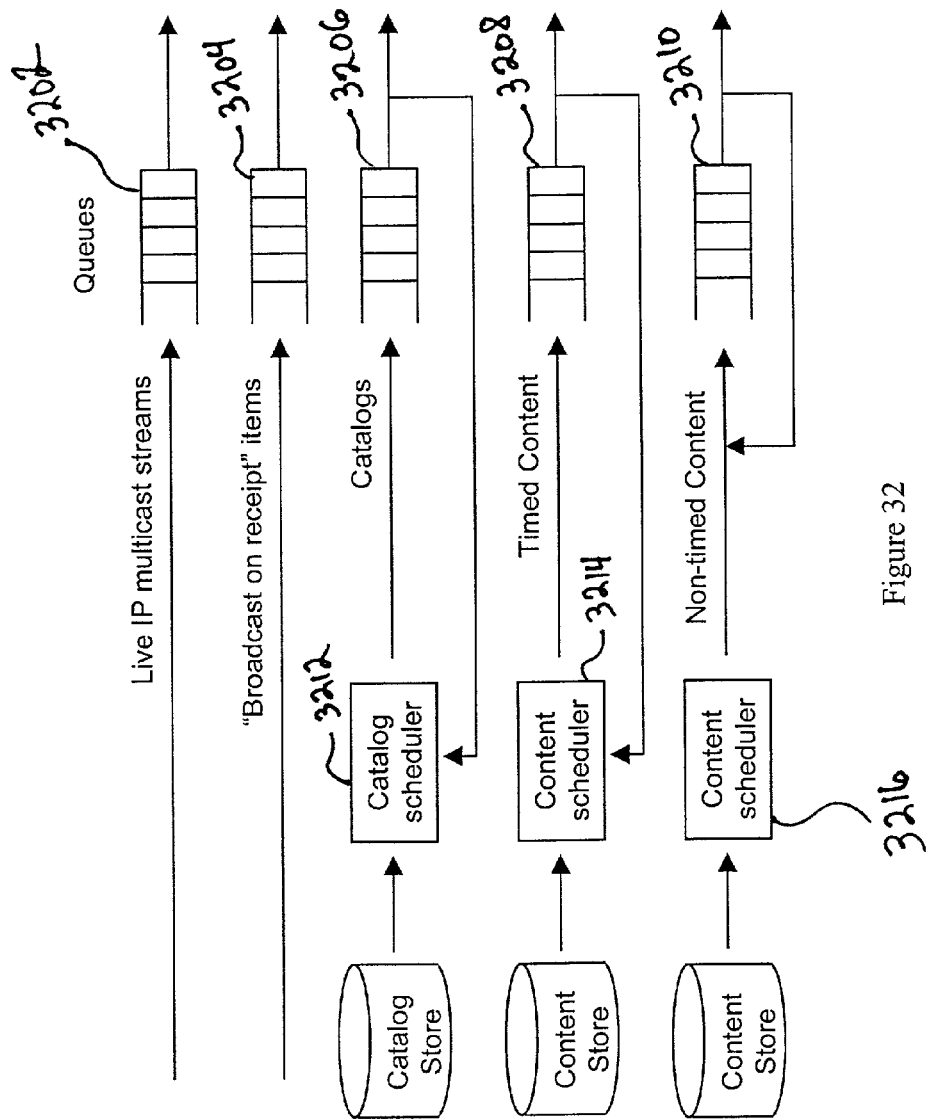
FIG. 32 illustrates the queuing system that can be used by a Liaison unit 104 to manage the flow of content to a Mixing unit, taking into account the different types of content, their priorities, and their schedules.
Figure 34:
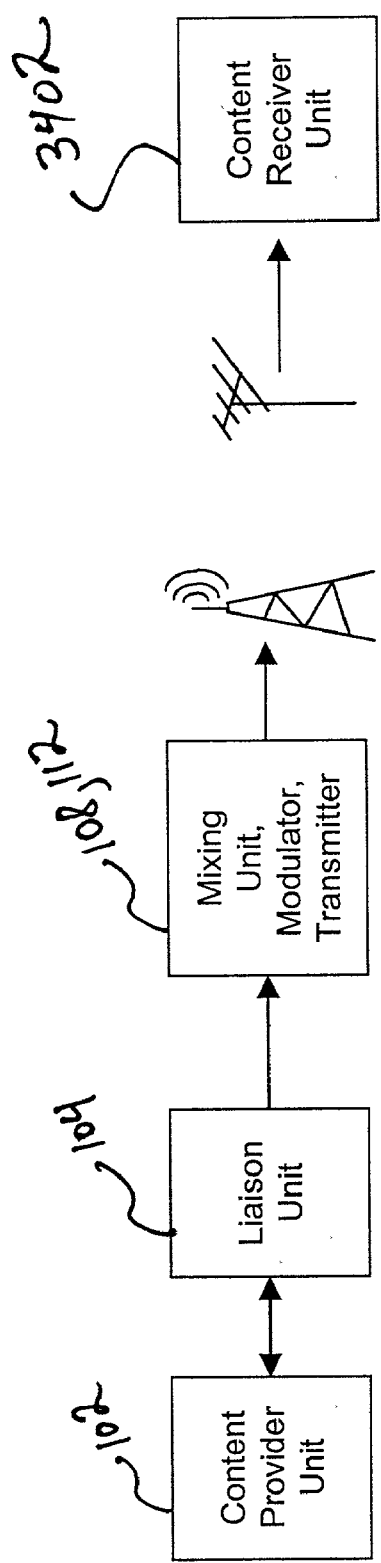
FIG. 34 illustrates the end-to-end architecture of a data broadcast system, showing a Content Provider unit 102, a Liaison unit 104, and a Content Receiver unit 3402.

This can all be handled by having five queues of content to be broadcast, as shown in FIG. 32. The top priority queue 3202 can contain live streaming media packets that have arrived. After each of these packets is taken from the queue and sent to the Mixing unit 108, it can be discarded. The next highest priority queue 3204 can contain items that were specified to be "broadcast on receipt." After each of these items is taken from the queue and sent to the Mixing unit 108, it can be discarded. The third priority queue 3206 can contain the catalogs, which are treated as timed content items, since they are to be broadcast at regular intervals. They can be put on the queue by a Catalog scheduler 3212 whenever their broadcast time arrives. Each time a catalog is taken from the queue and sent to the Mixing unit, it can be returned to the Catalog scheduler 3212, which can put it back on the queue when the time arrives for it to be broadcast again. The fourth priority queue 3208 can contain timed content items, which can be put on the queue by a Content scheduler 3214 whenever their time to be broadcast arrives. Each time a timed content item is taken from the queue and sent to the Mixing unit, it can be returned to the Content scheduler 3214, which can put it back on the queue when the time arrives for it to be broadcast again. The bottom priority queue 3210 can contain non-timed content items. They can be put on the queue initially by a Content scheduler 3216 when they are eligible to be broadcast. Each time a non-timed content item is taken from the queue and sent to the Mixing unit, it is returned to the back of the queue to be broadcast again some indeterminate time later (unless their broadcast duration or count has expired). Items are only taken from a queue to send to the Mixing unit when all higher priority queues have not items that can be broadcast, either because they are empty or because no more content can be taken from them without exceeding their bitrate limit.

Of course, it would be possible to decide on different assignments of priority levels to these different types of content.

To handle multiple priority levels within each of the categories of content items, each of the these queues can be implemented as multiple sub-queues with different priority levels.

Another important issue is how to enforce the bandwidth allocations for the accounts. The users at the Content Provider units are supposed to stay within their bandwidth allocation when they specify the broadcast schedules for content, but they may not always do so. Enforcement of the bandwidth allocation for the account, and also the bitrate specifications for individual content items, can be handled as follows:

A configurable time slice can be specified, for example 100 milliseconds. At the beginning of each time slice, the broadcast thread can look at the account's bandwidth allocation for the current time, and multiply by the length of the time slice to determine how much data should be sent out during that time slice. The thread can then start taking packets off the queues in order of priority until the correct amount of data has been sent out or all queues are empty, then sleep until the beginning of the next time slice. (The thread can usually send the content items to the output devices in far less time than the length of the time slice.)

The process can be modified slightly if a content item has a bitrate specified for it that is less than the bandwidth allocation for the account. For any such item the thread can multiply the bitrate limit for the item by the length of the time slice to get the maximum number of bytes of that content item that can be sent out during the time slice. After taking that number of bytes from that content item off the queue, the thread could move to the next item in the queue, leaving the rest of that content item to be sent out in subsequent time slices.

FIG. 33 gives an example to demonstrate how this process would work to send items from the broadcast queues to the Mixing unit, while ensuring that the account stays within its allocated bandwidth and also that each individual content item stays within its bitrate limit, if any. When output from different threads for different accounts is going to the same output device, a "synchronized" Java method can be used. (This is a Java mechanism for allowing multiple different threads to invoke the same operation on a software object without interfering with each other. With a synchronized method only one invocation can be active at a time; any subsequent invocations are blocked until the previous ones complete.)

3.6 Broadcasting Catalogs

Each catalog can be broadcast at configurable time intervals from the time the catalog is first sent to the Liaison unit 104 until the end of the broadcast time for the content items specified in the catalog. The PID and UDP/IP address and port used for each catalog can be those specified as the default values for the account, or a single dedicated PID and UDP/IP address and port can be used for all of them, or two copies of the catalogs can be broadcast, one with the PID and UDP/IP address and port of the account, and one with the dedicated PID and UDP/IP address for catalogs.

The advantage of having the catalogs for an account have the same PID and UDP/IP address and port as the content for the account is that a receiver interested in only that one account can extract the catalog and content from the broadcast stream very efficiently. The advantage of having all the catalogs have a single dedicated PID and UDP/IP address and port is that a receiver can extract all of the catalogs very efficiently and use that to determine the most efficient way to extract whatever content is desired.

The Liaison unit 104 can also send out at configurable time intervals two mapping files that will enable receivers to find all the catalogs (and therefore all the content). One file can contain a list of all PIDs being used for data broadcast by the Liaison unit 104, with the IP-to-MPEG encapsulation method being used for each one. Another file can contain a list of all the default PID and UDP/IP destination address/port combinations for the accounts—i.e., all the PIDs and UDP/IP destination address/port combinations where catalogs can be found. These files can be in a dedicated PID with a dedicated destination address and port so receivers will know where to find it. If for some reason these dedicated PIDs and address/port combinations cannot be used in a particular situation, Content Receiver subsystems can be configured to override them with different values for specific physical broadcast channels. Pre-set encapsulation methods can be used for these files, for example UHTTP encapsulation of files into UDP/IP datagrams and "addressable section" encapsulation of UDP/IP datagrams into MPEG-2 transport stream packets. If these pre-set methods cannot be used in particular situations for some reason, Content Receiver systems can be configured to override the specification of what encapsulation methods are being used for these files in specific physical channels.

Alternatively, the service discovery mechanisms of the ATSC Data Broadcast Standard can be used to identify the location and encapsulation protocols of the mapping files, and perhaps even the catalogs themselves, so receivers will be able to find them.

3.7 Monitoring and Reporting Bandwidth Usage and Items Broadcast

Each time the broadcast thread finishes a time slice, it can update an in-memory register telling how many bytes have been broadcast during the current hour, and it can update another in-memory register giving the names and time stamps of content items that have been broadcast. Periodically a thread can fire up and write the bandwidth utilization and the list of broadcast content to a Log 822, implemented as a database or file.

Standard reporting tools can then be used to generate reports 824 of various kinds from this data.

3.8 Configuring the Liaison Unit 104

The Liaison unit 104 can include a user interface for maintaining various parameters, including:

A. Time interval at which catalogs should be broadcast.
B. The size of the time slice for the broadcast threads to use.
C. IP encapsulation method for each PID—to be used if the Liaison unit 104 is delivering MPEG-2 transport stream packets directly to a multiplexer. Possible encapsulation methods include the "addressable sections" protocol of the ATSC Data Broadcast Standard, or the proprietary "data piping" method used by some early vendors of data broadcast systems (including TRIVENI DIGITAL).

4. Receiver Subsystem Design

A Content Receiver subsystem can be implemented as software running on a Personal Computer (PC) running under the Windows98 operating system, with a DTV card such as the TRIVENI DIGITAL DTVCARD A1000 installed in it. The software can be written in the Java programming language. Device drivers can be developed for such cards, using the usual device driver implementation techniques in the Windows operating system, that allow applications running in the PC to direct the DTV card to tune to a specified physical channel number and to monitor specified PIDs for UDP/IP packets. These device drivers can be made available to applications running in a Java Virtual Machine by means of a so-called "Java Native Interface" (JNI). Writing a JNI for a device driver is a straightforward software development task. Applications can then access the UDP/IP packets arriving in those PIDs through the usual Winsock IP protocol stack. I.e., applications can just open sockets for any desired destination IP address and port, using the usual Java packages for network operations, and read the packets that arrive with that destination address and port.

Figure 37:
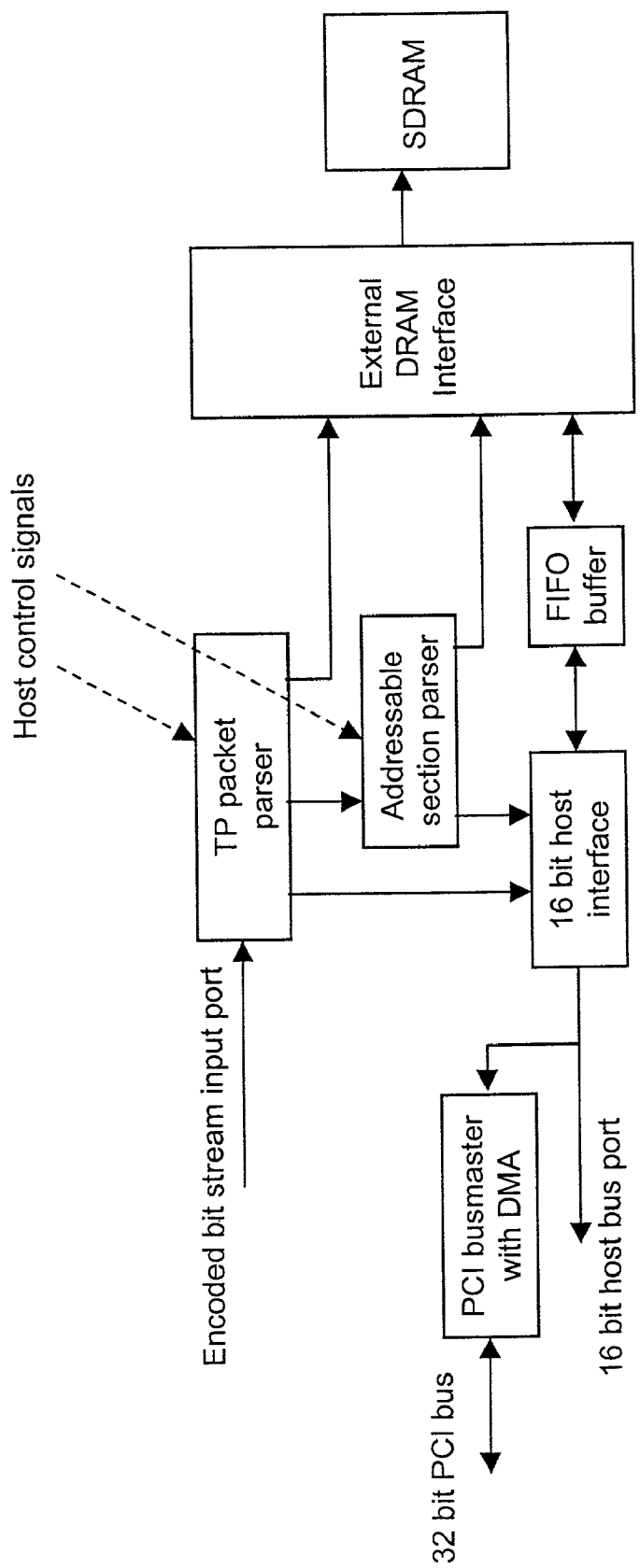
FIG. 37 shows a typical hardware architecture for a DTV receiver card that implements hardware filtering of MPEG-2 Transport Stream packets and IP datagrams contained in DSM-CC Addressable Sections.

Many DTV cards have the ability to filter out MPEG-2 transport stream packets with a certain number of specified PIDs in hardware, with no load on the central processor, and to filter out IP packets with a certain number of specified IP addresses in hardware, with no load on the central processor. Thus, it is often very advantageous for an application to know when it only needs to monitor a limited number of PIDs and/or IP addresses. FIG. 37 shows a typical hardware architecture for PID filtering and IP packet filtering in a DTV receiver card for a PC. DTV cards with such device drivers are available from a number of other vendors besides TRIVENI DIGITAL, such as HAUPPAUGE, BROADLOGIC and ACCESSDTV.

Figure 35:
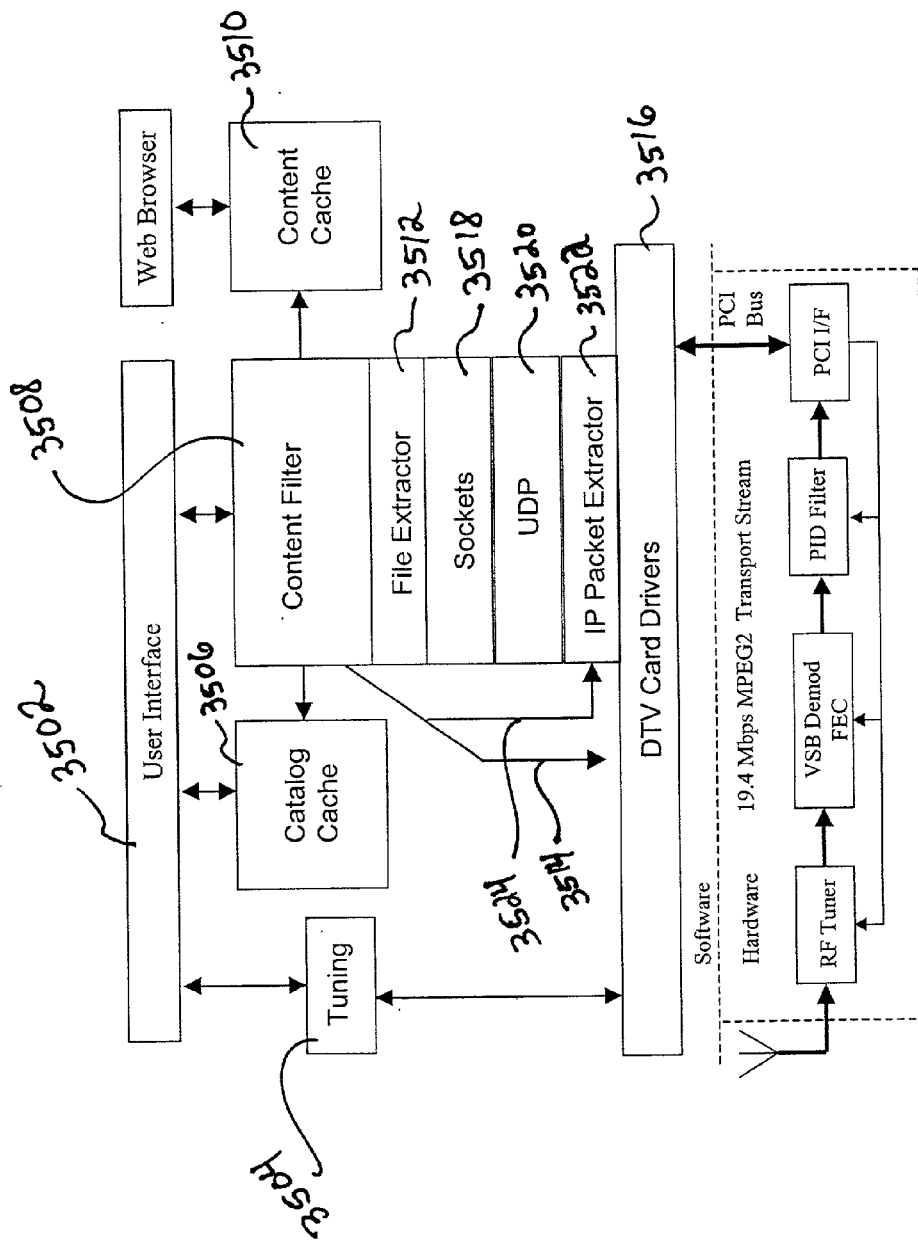
FIG. 35 shows a possible software architecture for a Content Receiver Unit 3402.

FIG. 35 shows a possible software architecture for a Content Receiver unit 3402. In this example the underlying hardware provides PID filtering, but IP packet filtering is done in software. The DTV card drivers 3516 can feed the MPEG-2 transport stream packets up to the IP Packet Extractor 3522. The UP Packet Extractor can feed the IP packets up to the UDP 3520 and Sockets 3518 components, which are part of the standard UDP/IP protocol stack. The File Extractor 3512 can simply open sockets for the UDP/IP packets it wants and extract the encapsulated files from the UDP/IP packets. The Content Filter 3508 can then take the files it wants and save them in the Content Cache 3510, and it can discard any other files. When catalogs arrive in the broadcast, the Content Filter 3508 can save them in the Catalog Cache 3506. The User Interface 3502 can present the catalogs from the Catalog Cache 3506 to the user and let the user select which files to save. It can then convey this information to the Content Filter 3508. The Content Filter can use the information given to it by the User Interface 3502 in conjunction with the information in the catalogs in the Catalog Cache 3506 to guide its filtering.

To make the process more efficient, the Content Filter can convey information through calling interfaces 3524 and 3514 to the IP Packet Extractor and the PID Filter as to which IP addresses and PIDs it is going to need, so they can send up the protocol stack only those packets with IP addresses and PIDs that are going to be needed.

Figure 36:
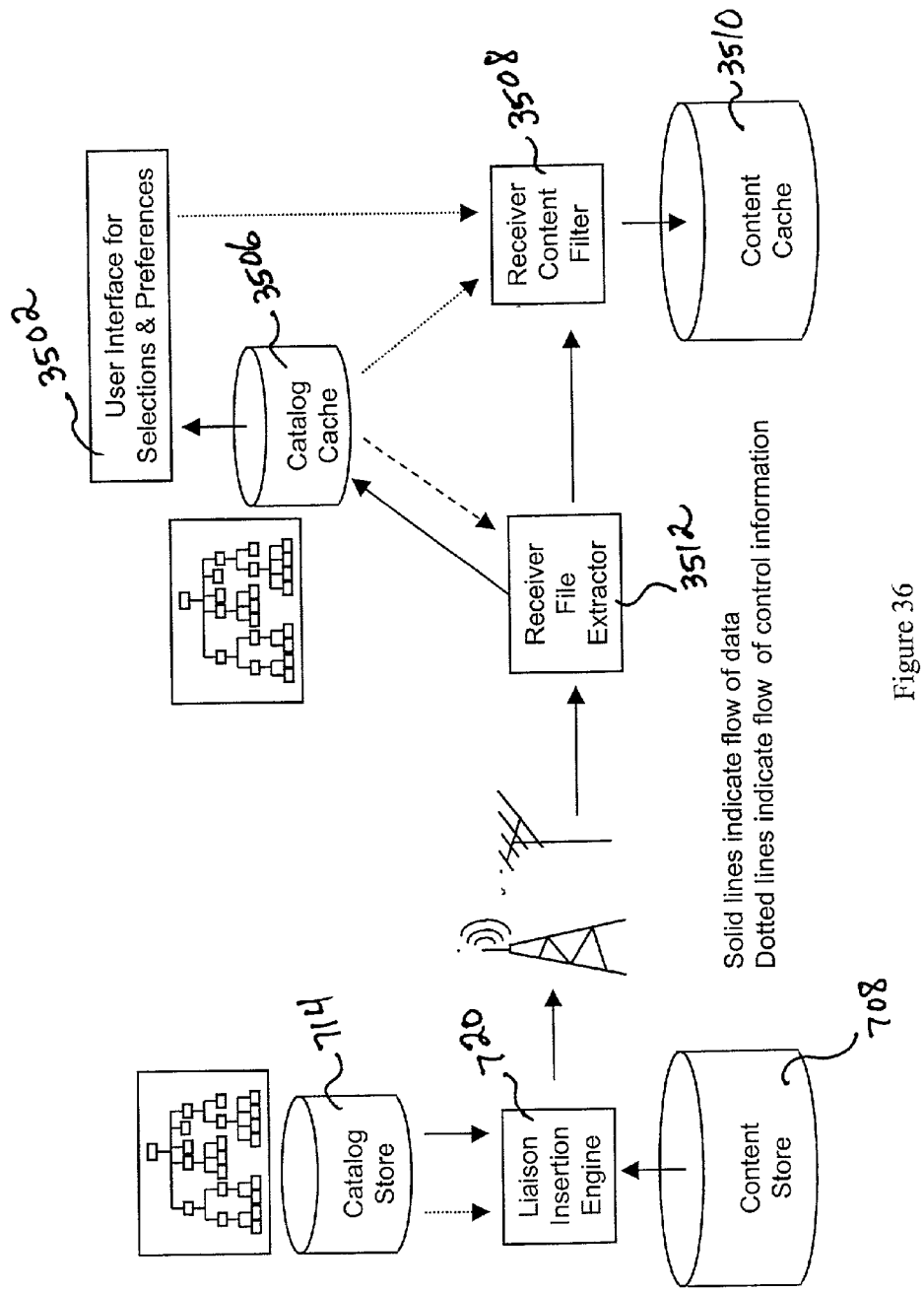
FIG. 36 shows how the content specifications and schedules that are produced by a Content Provider unit 102 can be used by the Content Filter 3508 of a Content Receiver unit 3402 as well as by the Insertion Engine 820 of a Liaison unit 104.

FIG. 36 shows that in this way the same catalogs containing specifications and schedules that drive the broadcasting process at the Liaison unit can be used to drive the content extraction process at the Content Receiver unit.

4.1 Locating Content in the Broadcast Stream

The Content Receiver subsystem can show the user a listing of all the content items arriving in any physical DTV channel by means of the following steps:

A. The User Interface 3502 of the Content Receiver unit 3402 can allow the user can select any channel between 2 and 69, and the User Interface 3502 can direct the DTV card to tune to that channel by means of the Tuner component 3504, which in turn makes calls to the DTV Card Drivers 3516.

B. The Content Filter 3508 can then direct the DTV card to feed up the protocol stack all packets with the dedicated PID and UDP/IP address and port that holds the mapping files listing all the PIDs containing data, with their encapsulation protocols, and giving the PIDs and UDP/IP addresses and ports for the catalogs.

C. The Content Filter 3508 can then extract these files by opening a socket on the UDP/IP destination address and port, reading the UDP/IP packets that arrive through the socket, and reconstructing the files from the UDP/IP packets.

D. The Content Filter 3508 can then direct the DTV card to monitor all PIDs containing catalogs, open sockets on all destination address/port combinations that hold catalogs, and reconstruct all the catalogs (which are in the form of XML files). These catalogs can all be stored in the Catalog Cache 3506. This operation is often most efficient when the catalogs all have the same PID and IP address.

E. The User Interface 3502 can then display a list of all the catalogs to the user and allow the user to click on an icon of some sort associated with each catalog to display the content hierarchy in the catalog, using the usual display techniques for such a hierarchy.

F. The information displayed for each content item in the hierarchy can include:
  1. Name and version number
  2. Content type
  3. Destination location for files, or destination UDP/IP address and port for live media streams
  4. Broadcast start time, end time, and slot schedules
  5. Attribute values indicating content subject matter classification The user can then play any live media streams by having an appropriate player for the type of content listen on the UDP/IP destination address and port given in the catalog at the broadcast times listed in the catalog.

When a user is viewing the information for any content item of type file or directory, the User Interface 3502 can provide a check box for the user to indicate that the content item should be extracted from the broadcast and saved in the Content Cache 3510 on the local disk of the PC. It can also provide a check box for the user to indicate that the content item should be saved to a more permanent location, and a file entry and/or selection facility for the user to indicate where it should be saved. A record of all content item selections made by the user can be stored in a file.

The User Interface 3502 can also present the user with a list containing all the subject area classification values that appear in any catalog and allow the user to select any number of these values, with the intent that user wants the Content Receiver unit to save in cache all content items with at least one subject area classification value matching some value in the list. It would be only slightly more complicated to allow the user to specify more complex boolean conditions on the attributes to be matched. A record of the values selected by the user can be stored in a file.

4.2 Extracting Content From the Broadcast Stream

The Content Filter 3508 of the Content Receiver subsystem can then handle content extraction as follows:

A. Any subject area classification values selected by the user can be compared with the catalogs to derive a list of content items to be extracted. This list can be augmented with any content items specifically selected by the user for extraction. The list can contain the account ID, catalog ID, and content ID for each content item to be extracted.

B. From this list and the associated catalog information it can be easily identified which PIDs and which UDP/IP address/port combinations need to be monitored to receive the files in the list. The Content Filter 3508 can then tell the DTV Card Drivers 3516 and the IP Packet Extractor 3522 to feed the necessary PIDs and UDP/IP addresses up the protocol stack.

C. With the ATVEF/DDE-1 UHTTP protocol, and other similar protocols, a small header in each UDP/IP packet payload contains a unique identifier for the file the packet belongs to and gives the block number of the file block contained in the packet. The blocks of each file can always be sent in order by the Liaison unit 104, so that the Content Filter 3508 will always receive the first block of a file, containing the HTTP header for the file, before receiving the other blocks of the file. By looking at the account ID, catalog ID, and content ID fields in the HTTP header of the file, the Content Filter can decide whether that file is to be extracted or not. If it is to be extracted, the Content Filter can save the other blocks of the file as they come along. Otherwise it can direct the File Extractor 3512 to discard all the blocks of the file. When saving content items in the Content Cache 3510, the cache manager can store them in subdirectories structured by account ID, catalog ID, and destination location. If necessary, as indicated by the catalogs, the cache manager can perform decryption, decompression, and/or forward error recovery on the files before storing them in the Content Cache 3510.

Figure 38:
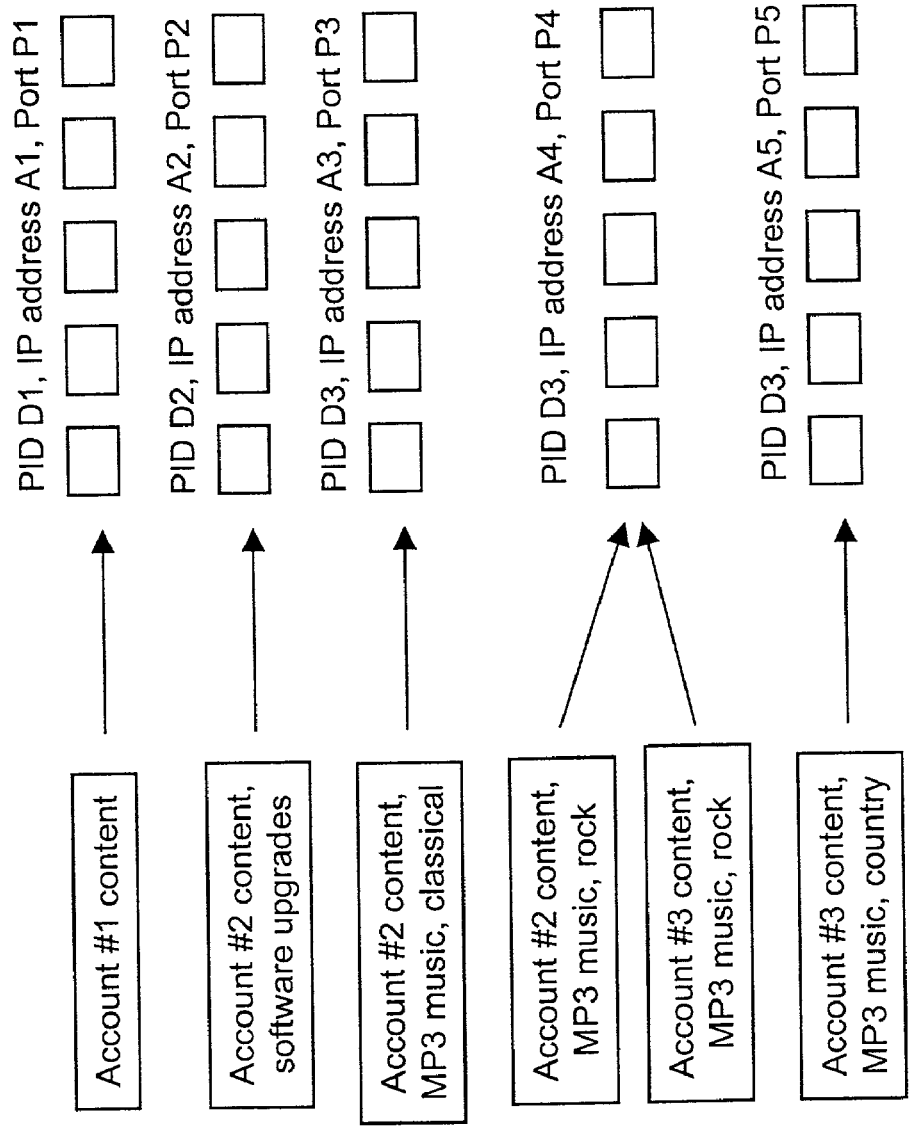
FIG. 38 illustrates how different types of content can be transmitted in MPEG-2 Transport Stream packets with different PIDs and IP datagrams with different destination UDP/IP addresses and ports.

FIG. 38 illustrates how content can be organized in such a way that PID and IP adddress filtering can be used to great advantage, when supported by the catalogs in the broadcast stream that allow a Content Receiver unit 3402 to identify which PIDs and IP addresses contain content of interest to the user. In the example shown in FIG. 38, if a user is interested only in content from account #1, then only transport stream packets with PID D1 need to be fed up the protocol stack, and if a user is interested only in rock music, then only packets with PID D3 and IP address A4 need to be fed up the protocol stack.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data broadcasting system for delivering digital content in the form of arbitrary files and streams of communication protocol packets to multiple recipients simultaneously over a broadcast or multicast medium, the data broadcast system comprising:

at least one content provider unit to identify the arbitrary files and streams of communication protocol packets to be delivered in the data broadcasting system, and to generate scheduling instructions for feeding these files and streams of the digital content into the broadcast or multicast medium for transmission; and a content liaison unit to pre-allocate a bandwidth profile ahead of time to each of the at least one content provider unit, to receive specifications including identifications of the files and streams and the scheduling instructions from each of the at least one content provider unit, and to feed the identified files and communication protocol packets into the broadcast or multicast medium according to the scheduling instructions without exceeding the pre-allocated bandwidth profile, wherein the bandwidth profiles are communicated from the content liaison unit to the at least one content provider unit over a communication network, and the specifications and the scheduling instructions are communicated from the at least one content provider unit to the content liaison unit over a communication network, wherein each bandwidth profile is in the form of a specification of a bit rate available in the broadcast or multicast medium as a function of time, with no reference to data types, data formats, or other properties of the digital content of the files that can be transmitted within the corresponding bandwidth profile at any particular time, and wherein the content liaison unit pre-allocates each bandwidth profile without imposing restrictions on times at which the transmission of individual files or communication protocol packets start and end, other than a restriction that a total bit rate used by all files and communication protocol packets being transmitted at any given time is not to exceed the bit rate available at that time under the corresponding pre-allocated bandwidth profile.

2. The data broadcasting system of claim 1, wherein the content liaison unit includes:

a content provider (CP) interface to receive, from the at least one content provider unit, a specification of the digital content that is to be inserted into the broadcast or multicast medium and an insertion schedule by which the digital content is to be inserted into the broadcast or multicast medium;

a collection unit, responsive to the CP interface, to collect digital files of the digital content by at least one of actively retrieving and reactively receiving the digital files from a source thereof identified in the specification; and an insertion unit, responsive to the CP interface, to transfer the digital files from the collection unit to the broadcast or multicast medium according to the insertion schedule.

3. The data broadcasting system of claim 2, wherein the collection unit includes memory into which the collection unit is configured to store the digital files so as to decouple, in time, the collection and the transfer of the digital files.

4. The data broadcasting system of claim 2, wherein:

the content provider unit is a first content provider unit, the specification is a first specification and the insertion schedule is a first insertion schedule;

the CP interface also is configured to receive, from a second content provider unit, a second specification of second digital content that is to be inserted into the broadcast or multicast medium and a second insertion schedule by which the second digital content is to be inserted into the broadcast or multicast medium;

the collection unit also is configured to collect the second digital content by at least one of actively retrieving and reactively receiving the second digital content from a source thereof identified in the second specification;

the insertion unit also being configured to transfer the second digital content from the collection unit to a mixing unit according to the second insertion schedule.

5. The data broadcasting system of claim 4, wherein the first specification, the first insertion schedule, the second specification and the second insertion schedule are provided to the CP interface using a common communications protocol.

6. The data broadcasting system of claim 2, wherein the specification includes at least one of the following:

- an indication of whether the digital content consists of a file, a directory, or a stream of communication protocol packets;
- a resource locator to define a location where the digital content can be obtained by the content liaison unit;
- a transfer schedule by which the content liaison unit is to obtain the digital content;
- an indication of whether the content liaison unit will actively retrieve or responsively receive the digital content from a source of the digital content;
- an indication of whether the digital content is to be compressed by the corresponding content provider unit or by the content liaison unit;
- an indication of whether the digital content is to be encrypted by the corresponding content provider unit or by the content liaison unit; and
- an indication of whether the digital content is to undergo forward error correction transformations by the corresponding content provider unit or by the content liaison unit.

7. The data broadcasting system of claim 6, wherein the transfer schedule includes a first set of at least one time for the digital content to be collected and a second set of at least one time for the digital content to be transferred, the second set being different than the first set.

8. The data broadcasting system of claim 2, wherein the content liaison unit is sufficiently robust to interpret a valid insertion schedule whenever the insertion schedule is defined in terms of each of the following scheduling parameters taken alone or in combination:

- a start time of a time slot during which an item can be output from the content liaison unit to the broadcast system;
- an end time for the time slot;
- a duration (D) of the time slot;
- a time interval (INT) between successive outputs of the item from the content liaison unit to the broadcast or multicast medium during the time slot;
- a number (N) of times that the item is to be output from the content liaison unit to the broadcast or multicast medium during a time slot;
- a size (S) of the item; and
- a bitrate (BTR) at which the item is to be output from the content liaison unit to the broadcast or multicast medium.

9. The data broadcasting system of claim 8, wherein the insertion schedule is a microschedule;

- wherein the CP interface receives a macroschedule including at least one recurring time slot, each recurring slot having a microschedule, respectively; and
- wherein the insertion unit is responsive to the macroschedule.

10. The data broadcasting system of claim 8, wherein, if two or more of the scheduling parameters are contradictory, then the content liaison unit applies at least one conflict resolution rule to ignore at least one of the contradictory scheduling parameters in order to interpret the insertion schedule to be valid.

11. The data broadcasting system of claim 10, wherein the at least one conflict resolution rule includes at least one of the rules from the following Rule Table:

Rule Table

| Parameters Specified | | | | |
|---|---|---|---|---|
| INT | BTR | D | N | Rule |
| Y | Y | Y | Y | If INT < S/BTR, set INT = S/BTR Ignore N, Output at INT using BTR, for D (timed), |
| Y | Y | Y | N | If INT < S/BTR, set INT = S/BTR Output at INT using BTR, for D (timed), |
| Y | Y | N | Y | If INT < S/BTR, set INT = S/BTR Output at INT using BTR, N times (timed), |
| Y | Y | N | N | If INT < S/BTR, set INT = S/BTR Output at INT using BTR, indefinitely (timed), |
| Y | N | Y | Y | Set BTR = account BTR, If INT < S/BTR, set INT = S/BTR Ignore N, Output at INT using BTR, for D (timed), |
| Y | N | Y | N | Set BTR = account BTR, If INT < S/BTR, set INT = S/BTR Output at INT using BTR, for D (timed), |
| Y | N | N | Y | Set BTR = account BTR, If INT < S/BTR, set INT = S/BTR Output at INT using BTR, N times (timed), |
| Y | N | N | N | Set BTR = account BTR, If INT < S/BTR, set INT = S/BTR Output at INT using BTR, indefinitely (timed), |
| N | Y | Y | Y | Set INT = D/N, If INT < S/BTR, set INT = S/BTR Output at INT using BTR, for D (timed), |
| N | Y | Y | N | Set INT = S/BTR, Output at INT using BTR, for D (timed), |
| N | Y | N | Y | Set INT = S/BTR, Output at INT using BTR, N times (timed), |
| N | Y | N | N | Set INT = S/BTR, Output at INT using BTR, indefinitely (timed), |
| N | N | Y | Y | Set BTR = account BTR, Set INT = D/N, If INT < S/BTR, set INT = S/BTR Output at INT using BTR, for D, |
| N | N | Y | N | Output for D (non-timed), |
| N | N | N | Y | Output N times (non-timed), |
| N | N | N | N | Output indefinitely (non-timed). |

12. The data broadcasting system of claim 2, wherein the CP interface receives the specification and the insertion schedule represented as at least one XML document from the corresponding content provider unit.

13. The data broadcasting system of claim 2, wherein the specification includes an account, each account including at least one catalog, each catalog including at least one independent item to be output by the content liaison unit to the broadcast or multicast medium or at least one group of related items to be output by the content liaison unit to the broadcast or multicast medium, each group including a group of related items or an independent item.

14. The data broadcasting system of claim 2, wherein:

- the specification and insertion schedule are associated with an account; and
- the insertion unit limits an insertion-schedule-dictated transference of the digital content so as to comply with a bandwidth allocation for the account.

15. The data broadcasting system of claim 14,

- wherein the insertion unit limits the transference by processing the insertion schedule as a plurality of incremental time slices, the bandwidth allocation representing a maximum data amount of data that can be transferred in each time slice, respectively; and wherein, if transference of the maximum amount of data takes place before the end of a time slice, then the insertion unit suspends the transference until a next time slice begins.

16. A method as embodied in elements which form the content liaison unit of claim 2.

17. A computer-readable medium encoded with a computer program being executed by a processor to implement the content liaison unit of claim 2.

18. The data broadcasting system of claim 2, wherein the content liaison unit further includes a bandwidth management unit configured to pre-allocate the bandwidth profile to each of the at least one content provider unit.

19. The data broadcast system of claim 1, wherein each of the at least one content provider unit includes:
   an insertion schedule generator to generate a specification of the digital content to be inserted into the broadcast or multicast medium and an insertion schedule by which the digital content is to be inserted; and
   an interface to a liaison unit to provide, in a machine-readable form, the specification of the digital content that is to be inserted into the broadcast or multicast medium and the insertion schedule by which the digital content is to be inserted into the broadcast or multicast medium.

20. The data broadcasting system of claim 19, further comprising a source of the digital content.

21. The data broadcasting system of claim 19, wherein
   the broadcast system is a first broadcast system, the machine-readable form is a first machine-readable form, the specification is a first specification, and the insertion schedule is a first insertion schedule; and
   the corresponding content provider unit is configured to provide to a second broadcast system, in a second machine-readable form, a second specification of second digital content that is to be inserted into the broadcast or multicast medium and a second insertion schedule by which the second digital content is to be inserted into the broadcast or multicast medium.

22. The data broadcasting system of claim 21, wherein each of the first machine-readable form and the second machine-readable form is compliant with a common protocol.

23. The data broadcasting system of claim 19, wherein the specification includes at least one of the following:
   an indication of whether the digital content consists of a file, a directory, or a stream of communication protocol packets;
   a resource locator to define a location where the digital content can be obtained by a broadcaster unit;
   a transfer schedule by which the broadcaster unit is to obtain the digital content;
   an indication of whether the broadcaster unit will actively retrieve or responsively receive the digital content from a source of the digital content;
   an indication of whether the digital content is to be compressed by the corresponding content provider unit or by the liaison unit;
   an indication of whether the digital content is to be encrypted by the corresponding content provider unit or by the content liaison unit; and
   an indication of whether the digital content is to undergo forward error correction transformations by the corresponding content provider unit or by the content liaison unit.

24. The data broadcasting system of claim 19, wherein the machine-readable form is a first machine-readable form, and the specification is a first specification and the insertion schedule is a first insertion schedule, the first specification and the first insertion schedule corresponding to a first account maintained by the corresponding content provider unit, the first account being bounded by a first bandwidth allocation; and
   the corresponding content provider unit is configured to provide, to the broadcast or multicast medium in a second machine-readable form, a second specification of second digital content that is to be inserted into the broadcast or multicast medium and a second insertion schedule by which the second digital content is to be inserted into the broadcast or multicast medium, the second specification and the second insertion schedule corresponding to a second account maintained by the corresponding content provider unit, the second account being bounded by a second bandwidth allocation different than the first bandwidth allocation.

25. The data broadcasting system of claim 19, wherein the insertion schedule generator is sufficiently robust to generate a valid insertion schedule in terms of each of the following scheduling parameters taken alone or in combination:
   a start time of a time slot during which an item can be output from the content liaison unit to the broadcast or multicast medium;
   an end time for the time slot;
   a duration of the time slot;
   a time interval between successive outputs of the item from the content liaison unit to the broadcast or multicast medium during the time slot;
   a number of times that the item is to be output from the content liaison unit to the broadcast or multicast medium during a time slot;
   a size of the item; and
   a bitrate at which the item is to be output from the content liaison unit to the broadcast or multicast medium.

26. The data broadcasting system of claim 25, wherein the insertion schedule is a microschedule, and
   wherein the insertion schedule generator is configured to provide a macroschedule including at least one recurring time slot, each recurring slot having a microschedule, respectively.

27. The data broadcasting system of claim 19, wherein the machine readable form includes representation of the specification and the insertion schedule as at least one XML document.

28. The data broadcasting system of claim 19, wherein the specification includes an account,
   each account including at least one catalog, each catalog including at least one independent item to be output by the content liaison unit to the broadcast or multicast medium or at least one group of related items to be output by the content liaison unit to the broadcast or multicast medium, each group including a group of related items or an independent item.

29. A method as embodied in elements which form the content provider unit of claim 19.

30. A computer-readable medium encoded with a computer program being executed by a processor to implement the content provider unit of claim 19.

31. The data broadcasting system of claim 1, wherein the broadcast or multicast medium into which the digital content is inserted is a digital television signal or a satellite signal.

32. The data broadcasting system of claim 1, wherein prior to the allocation of the bandwidth profile, the at least one content provider unit and the content liaison unit negotiate with each other over a communication network regarding the allocation of the bandwidth profile.

33. The data broadcasting system of claim 1, further comprising:

at least one receiver device to receive the broadcast or multicast medium including the digital content and to extract data from the received broadcast or multicast medium.

34. The data broadcasting system of claim 1, wherein each pre-allocated bandwidth profile is not tied to any advertisement slot allocated within the broadcast or multicast medium.

* * * * *